United States Patent
Sukhomlinov et al.

(10) Patent No.: US 10,831,491 B2
(45) Date of Patent: Nov. 10, 2020

(54) SELECTIVE ACCESS TO PARTITIONED BRANCH TRANSFER BUFFER (BTB) CONTENT

(71) Applicant: Intel Corporation, Santa Clara, CA (US)

(72) Inventors: Vadim Sukhomlinov, Santa Clara, CA (US); Kshitij Doshi, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 16/023,201

(22) Filed: Jun. 29, 2018

(65) Prior Publication Data

US 2019/0042263 A1 Feb. 7, 2019

(51) Int. Cl.
*G06F 9/40* (2006.01)
*G06F 21/50* (2013.01)
*G06F 21/55* (2013.01)
*G06F 9/38* (2018.01)
*G06F 9/30* (2018.01)
*H04L 9/00* (2006.01)
*G06F 21/52* (2013.01)

(52) U.S. Cl.
CPC ........ *G06F 9/3806* (2013.01); *G06F 9/30058* (2013.01); *G06F 9/3851* (2013.01); *G06F 9/3867* (2013.01); *G06F 21/556* (2013.01); *H04L 9/004* (2013.01); *G06F 9/3844* (2013.01); *G06F 21/50* (2013.01); *G06F 21/52* (2013.01)

(58) Field of Classification Search
CPC .. G06F 9/3806; G06F 9/30058; G06F 9/3851; G06F 9/3867; G06F 9/3842; G06F 9/3844; G06F 9/3846; G06F 21/50; G06F 21/52; G06F 21/556; G06F 21/566; H04L 9/004
USPC ......... 712/227, 238–240; 713/164, 165, 166, 713/167; 726/22, 23, 24, 25
See application file for complete search history.

(56) References Cited

U.S. PATENT DOCUMENTS

| | | | |
|---|---|---|---|
| 2004/0186985 A1* | 9/2004 | Tran .................. | G06F 9/3804 712/239 |
| 2008/0052499 A1* | 2/2008 | Koc .................. | G06F 9/3806 712/238 |
| 2016/0092677 A1* | 3/2016 | Patel .................. | G06F 21/55 726/23 |
| 2019/0227802 A1* | 7/2019 | Kessler .................. | G06F 7/588 |

OTHER PUBLICATIONS

Kocher, Paul, et al., Spectre Attacks: Exploiting Speculative Execution, date unknown, 19 pages.

* cited by examiner

*Primary Examiner* — Daniel H Pan
(74) *Attorney, Agent, or Firm* — Alliance IP, LLC

(57) ABSTRACT

The present disclosure is directed to systems and methods for mitigating or eliminating the effectiveness of a side channel attack, such as a Spectre type attack, by limiting the ability of a user-level branch prediction inquiry to access system-level branch prediction data. The branch prediction data stored in the BTB may be apportioned into a plurality of BTB data portions. BTB control circuitry identifies the initiator of a received branch prediction inquiry. Based on the identity of the branch prediction inquiry initiator, the BTB control circuitry causes BTB look-up circuitry to selectively search one or more of the plurality of BTB data portions.

20 Claims, 7 Drawing Sheets

SELECTIVE ACCESS TO PARTITIONED BRANCH TRANSFER BUFFER (BTB) CONTENT

TECHNICAL FIELD

The present disclosure relates to computer security, specifically the prevention or mitigation of one or more classes of side-channel attack.

BACKGROUND

Side-channel attacks gained widespread notoriety in early 2018. A side-channel attack includes any attack based on information gained from the implementation of a computer system, rather than weaknesses in the implemented algorithm itself. Such side-channel attacks may use timing information, power consumption, electromagnetic leaks or even sound as an extra source of information, that is exploited to obtain information and/or data from the system. Side-channel attacks include Spectre and Meltdown, both of which rely on deducing whether data originates in a cached or un-cached location. To a significant degree, the determination of where data originates relies upon the precise timing of events such as loads from memory space.

Modern operating systems map the kernel into the address space of every process executed by the processor. Access to the kernel space is restricted using a supervisor bit of the processor that is set to permit kernel access to the kernel space and is reset to block or prohibit user access to the kernel space. Meltdown overcomes this memory isolation, thereby permitting the user process to read the entire kernel memory of the machine executing the user process. Meltdown relies upon out-of-order execution to obtain data from the kernel space. CPUs supporting out-of-order execution support running operations speculatively to the extent that processor's out-of-order logic processes instructions before the CPU is certain whether the instruction is valid and committed. Meltdown reads information from the protected kernel space by causing the processor to execute multiple instructions such as:

data=getByte(kernelAddress)
variable=probeArray(data)

The "getByte" instruction will ultimately fail because of the prohibited read of kernel memory. However, the simultaneous access of an element in "probeArray" will pull the data from "probeArray" into cache. By timing reads at addresses from 0 to 255 in cache, the attacker is able to deduce the content of "kernelAddress."

For example, after flushing the cache, the Meltdown attacker retrieves a value "01000000" (binary "64") from a first address in the kernel memory. Prior to the processor generating an exception to the unauthorized read from kernel memory, the attacker uses retrieved kernel data as an index to access element "64" in a known array located in user space. The processor retrieves the value of array element 64 and loads the value into cache. The attacker then attempts to read every element from the array—access times for elements 0-63 and 65-255 will be relatively long as the data is retrieved from main memory. However the access time for element 64 will be considerably shorter as the data need only be retrieved from the cache. From this the attacker can deduce the data the first address in kernel memory is "0100000". By performing the action for every location in kernel memory, the attacker is able to read the contents of the kernel memory.

A first class of Spectre attacks takes advantage of branch target misprediction by a CPU to read data from memory into cache. Upon detecting the misprediction, the CPU clears the data from the pipeline, but the data read into cache remains. A covert side-channel may then be used to obtain the residual data from the cache. In this class of attack, the attacker trains the branch predictor in a system to take a particular branch. For example, using the following instructions, an attacker may train the system by providing values for "x" that are consistently smaller than the size of "array1." The attacker thus trains the system to speculatively execute the subsequent instruction based on the assumption that the branch has been historically true:

```
if ( x < array1.size( )) {
    int value = array2[array1[x] * 256] // branch 1
}
```

After training the system, the attacker sets the cache to a known state and provides a value of "x" that exceeds the size of "array1." Having been previously trained that "x" is typically less than the size of "array1," the processor executes the branch instruction (prior to the processor throwing the exception due to "x" being greater than the size of "array1") and uses the value found at address "x" as an index to look up the value at address "x" in array2. The processor loads the value at address "x" in array2 into cache. The attacker then reads all of the values of array2 and is able to determine the value of "x" as the address in array2 having the shortest access time.

For example, assume array1 has 256 elements addressed "0" to "255." The attacker provides values of "x" between 0 and 255 to train the system that the branch instruction is routinely executed. The attacker then sets the cache to a known state and provides a value of 512 for "x" (i.e., a value greater than 255). The value "01000000" (i.e., "64") at memory location 512 is read. The processor then looks up the value of array2 at address 64*256 and loads the value into cache. The attacker then examines the read time for each element in array2, the read time for element at address 64*256 will be less than the read time for the other array2 addresses, providing the attacker the information that the address at memory location 512 is "01000000" or "64." By performing the action for every memory location, the attacker is able to read the contents of the memory byte-by-byte.

A second class of Spectre attacks exploits indirect branching by poisoning the Branch Target Buffer (BTB) such that a CPU speculatively executes a gadget that causes the CPU to read data from memory into cache. Upon detecting the incorrect branching, the CPU clears the data from the pipeline but, once again, the data read into cache remains. A covert side-channel may then be used to obtain the residual data from the cache. In this class of attack, the attacker poisons the BTB of the victim system by repeatedly performing indirect branches to a virtual address in the victim's system that contains the gadget. For example, an attacker may control the content of two registers (R1, R2) in the victim's system at the time an indirect branch occurs. The attacker must find a gadget in the victim's system that, upon speculative execution by the victim's CPU, leaks data from selected memory locations in the victim's system. The gadget may be formed by two instructions, the first of which contains an instruction that mathematically and/or logically (add, subtract, XOR, etc.) combines the contents of register R1 with another register in the victim's system and stores the result in R2. The second instruction reads the contents of register R2, storing the value in R2 in cache.

For example, the attacker may control two registers in the victim system, ebx (R1) and edi (R2). The attacker then finds two instructions on the victim's system, such as:

```
adc     edi,dword ptr [ebx+edx+13BE13BDh]
adc     dl,byte ptr [edi]
By selecting ebx = m − 0x13BE13BD − edx the attacker is able to
read the victim's memory at address "m." The result is then added
to the value in edi (R2). The second instruction in the gadget causes
a read of R2 which contains the sum of "m" plus the attacker's
value initially loaded into edi, transferring the value into the cache.
By detecting the location of R2 within the cache using a
side-channel timing attack, the attacker is able to
determine the value of "m."
```

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

DETAILED DESCRIPTION

Figure 1:
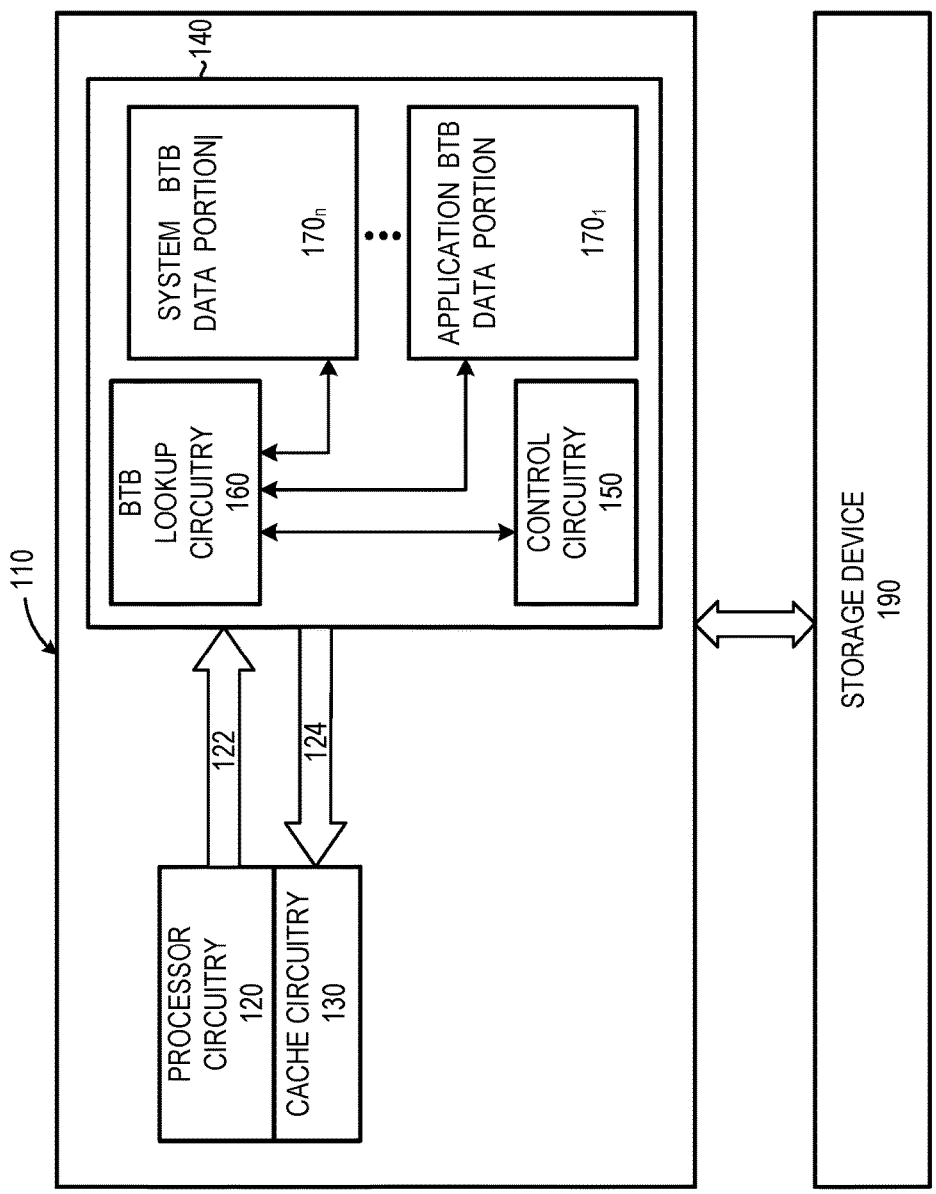
FIG. 1 provides a high level block diagram of an illustrative system that includes a central processing unit (CPU) that coupled to Branch Target Buffer ("BTB") circuitry that includes BTB control circuitry, BTB look-up circuitry, and a plurality of BTB data portions, in accordance with at least one embodiment described herein.

Speculative execution beneficially increases the speed of a system by allowing the processor to execute instructions independent of data and/or input/output (I/O) access. With speculative execution, a high percentage of the executed instructions will be needed by an application executed by the processor. Upon successful execution and integration of the result of the instruction into the application flow, the processor then "retires" the instruction. The small portion of speculatively executed instructions that do not complete successfully and/or are not integrated into the application flow are not retired by the processor and thus remain in an "unretired" state.

One form of speculative execution involves branch prediction. Branch prediction is performed by processors upon reaching a conditional branch instruction. In embodiments, branch prediction is performed using a Branch Target Buffer (BTB) that is populated with entries based on prior system performance. Upon reaching a branch instruction, the processor communicates the branch instruction to BTB look-up circuitry that examines the BTB and provides the processor with the expected branch based on prior system performance. The processor then executes the instructions along the predicted branch. If the prediction is correct (i.e., a "hit" occurs in the BTB), the processor circuitry is advantageously able to expedite the application execution. If the prediction is incorrect (i.e., a "miss" occurs in the BTB) the processor circuitry simply resumes execution at the branch instruction and executes the instructions along the correct branch. It often requires multiple clock cycles for the processor to detect such a BTB "miss"—during this time, the processor circuitry may execute instructions that result in the impermissible transfer of secret, protected, or hidden information and/or data to the processor cache circuitry. Although the data will remain unused, the location of the data within the processor cache circuitry may be sufficient to provide information to an attacker using a side-channel exploit.

Side-channel exploit attacks take advantage of the predictive nature of the BTB circuitry by initially poisoning the BTB such that the BTB provides incorrect branch predictions to the processor circuitry. During the attack, the predicted branch provided by the BTB circuitry is incorrect and rather than pointing at instructions useful to the application being executed, instead point to instructions that beneficially provide information and/or data to an attacker. This type of attack takes advantage of the delay between the time the branch prediction is made and instructions speculatively executed and the discovery by the processor circuitry that an incorrect branch prediction has occurred. This delay may be tens or even hundreds of clock cycles. During that time, the improperly executed instructions may transfer information to the processor cache circuitry. The content of the processor cache circuitry may then provide an attacker information about the retrieved data via a side-channel attack such as Spectre. The information provided to the attacker may include system or kernel level information as well as information from one or more clients on a shared server.

The systems and methods described herein beneficially and advantageously mitigate the information that may be obtained via a side channel attack by apportioning the BTB circuitry into a first portion accessible only by ring "0" applications (i.e., kernel and/or operating system level) and a second portion that is accessible by ring "0" and higher applications (i.e., user application level). Such segregation of the BTB circuitry beneficially and advantageously minimizes or even eliminates a user's or client's ability to corrupt the BTB circuitry and cause improper memory reads from secure or protected memory locations typically reserved for kernel level (i.e., Ring 0) access. The systems and methods described herein prevent user level (e.g., Ring 3) access to portions of the BTB circuitry containing branch prediction data associated with system level (e.g., Ring 0) operation.

In some of the systems and methods described herein, data included in the BTB circuitry includes an indicator that provides the BTB look-up circuitry with and indicator whether the associated data retained in the BTB circuitry is associated with a system level instruction, (e.g., an instruction originating at Ring 0) or a user level instruction (e.g., an instruction originating at Ring 3). In such an embodiment, the BTB look-up circuitry may examine the source of the instruction generating a BTB inquiry and provide predictive branch information designated as "system level" only when the inquiry is initiated by a system level instruction and returning a no entry or "miss" if the inquiry is initiated by a user level instruction. In other systems and methods described herein, the BTB circuitry itself may be apportioned into a first portion that contains data associated with system-level branch predictions and a second portion that contains data associated with user-level branch predictions. In such an embodiment, a BTB inquiry may be designated or otherwise identified as originating at the "system level" (Ring 0)—in which case the BTB look-up circuitry searches both the first portion (i.e., the system level portion) and the second portion (i.e., the user level portion) of the BTB circuitry. Alternatively, the BTB inquiry may be designated or otherwise identified as originating at the "user level" (Ring 3)—in which case only the user level, second portion, of the BTB circuitry may be searched by the BTB look-up circuitry.

In client-server systems, the BTB look-up circuitry included in the systems and methods described herein may receive data indicative of a client identifier (e.g., PCID) with each BTB inquiry. The BTB look-up circuitry may limit a user-level BTB inquiry including a client identifier to only the user-level BTB data associated with the respective client identifier. The BTB look-up circuitry may limit a user-level BTB inquiry to the user-level BTB associated with one or more client identifiers. Conversely, the BTB look-up circuitry may permit a system-level BTB inquiry access to both system-level and user-level BTB data across some or all of the client devices.

A branch prediction system is provided. The system may include: processor circuitry; Branch Target Buffer (BTB) circuitry coupled to the processor circuitry, the BTB circuitry including at least one system BTB data portion and at least one user BTB data portion; BTB control circuitry; BTB look-up circuitry coupled to the BTB control circuitry and the BTB circuitry; and a storage device coupled to the BTB control circuitry, the storage device including machine-readable instructions that, when executed by the BTB control circuitry, cause the BTB-control circuitry to: identify an initiator of a received branch prediction inquiry as a system level initiated branch prediction inquiry or a user level initiated branch prediction inquiry; and cause the BTB look-up circuitry to perform a branch prediction lookup using the respective at least one user BTB data portion associated with the user level inquiry initiator responsive to identification of the received branch prediction inquiry as an user level initiated branch prediction inquiry.

A branch prediction method is provided. The method may include: identifying, by Branch Target Buffer (BTB) control circuitry, whether a received branch prediction inquiry includes a system-level branch prediction inquiry or a user-level branch prediction inquiry; and performing, by BTB look-up circuitry coupled to the BTB control circuitry, a branch prediction lookup using the respective at least one user BTB data portion associated with the user level inquiry initiator responsive to identification of the received branch prediction inquiry as an user level initiated branch prediction inquiry.

A non-transitory machine-readable storage medium that includes instructions is provided. The machine-readable instructions, when executed by Branch Target Buffer (BTB) control circuitry, cause the BTB control circuitry to: identify whether a received branch prediction inquiry includes a system level branch prediction inquiry or a user level branch prediction inquiry; and cause communicably coupled BTB look-up circuitry to perform a branch prediction lookup using the respective at least one user BTB data portion associated with the user level inquiry initiator responsive to identification of the received branch prediction inquiry as an user level initiated branch prediction inquiry.

An electronic device is provided. The electronic device may include: a printed circuit board; processor circuitry coupled to the printed circuit board; Branch Target Buffer (BTB) circuitry coupled to the processor circuitry, the BTB circuitry including at least a system BTB data portion and a user BTB data portion; BTB control circuitry; BTB look-up circuitry coupled to the BTB control circuitry and the BTB circuitry; and a storage device coupled to the BTB control circuitry, the storage device including machine-readable instructions that, when executed by the BTB control circuitry, cause the BTB-control circuitry to: identify an initiator of a received branch prediction inquiry as a system level initiated branch prediction inquiry or a user level initiated branch prediction inquiry; and cause the BTB look-up circuitry to perform a branch prediction lookup using the respective at least one user BTB data portion associated with the user level inquiry initiator responsive to identification of the received branch prediction inquiry as an user level initiated branch prediction inquiry.

A branch prediction system is provided. The system may include: means for identifying whether a received branch prediction inquiry includes a system-level branch prediction inquiry or a user-level branch prediction inquiry; and means for performing a branch prediction lookup using the respective at least one user BTB data portion associated with the user level inquiry initiator responsive to identification of the received branch prediction inquiry as an user level initiated branch prediction inquiry.

As used herein, the term "processor cache" and "cache circuitry" refer to cache memory present within a processor or central processing unit (CPU) package. Such processor cache may variously be referred to, and should be considered to include, without limitation, Level 1 (L1) cache, Level 2 (L2) cache, Level 3 (L3) cache, and/or last or lowest level cache (LLC).

FIG. 1 provides a high level block diagram of an illustrative system 100 that includes a central processing unit (CPU) 110 that coupled to a Branch Target Buffer ("BTB") 140 that includes BTB control circuitry 150, BTB look-up circuitry 160, and a plurality of BTB data portions $170_1$-$170_n$ (collectively, "BTB data portions 170"), in accordance with at least one embodiment described herein. In embodiments, the BTB control circuitry 150 beneficially and advantageously causes the BTB look-up circuitry 160 to selectively search for branch prediction data in one or more BTB data portions 170 based, at least in part, on the initiator of a branch prediction inquiry 122. Thus, the BTB data portions 170 may include a system BTB data portion $170_1$ that includes branch prediction data associated with the speculative execution of system-level instructions and a user BTB data portion $170_2$ that includes branch prediction data associated with the speculative execution of user-level instructions. Upon receipt of a system-level branch prediction inquiry 122, the BTB control circuitry 150 causes the BTB look-up circuitry 160 to search both the system BTB data portion $170_1$ and the user BTB data portion $170_2$. However, upon receipt of a user-level branch prediction inquiry 122, the BTB control circuitry 150 causes the BTB look-up circuitry 160 to search only the user BTB data portion $170_2$ effectively isolating and preventing the poisoning of the system BTB data portion $170_1$.

Thus, the system 100 segregates the BTB data portions 170 thereby preventing user application level instructions (i.e., Ring 3) from accessing the system BTB data portion $170_1$. In embodiments, processor circuitry 120 may speculatively execute instructions, including branch instructions, to improve overall system speed and responsiveness. To determine which branch to speculatively execute, the processor circuitry 120 may communicate a branch prediction inquiry 122 to the Branch Target Buffer (BTB) 140. Within the BTB 140, the BTB control circuitry 150 processes the branch prediction inquiry 122 to determine the origin of the branch prediction inquiry 122. The BTB control circuitry 150 then causes the BTB look-up circuitry 160 to selectively search one or more BTB data portions 170 based, at least in part, on the identity of the branch prediction inquiry initiator.

If the BTB look-up circuitry 160 finds branch prediction data in the BTB data portion 170, the BTB look-up circuitry 160 returns the branch prediction data 124 to the control circuitry 120. If the branch prediction data 124 returned to the processor circuitry 120 is incorrect, the processor circuitry 120 may communicate a message to the BTB control circuitry 150 and the respective BTB data portion 170 may be updated to reflect the correct branch taken by the processor circuitry 120 upon retirement of the branch instruction.

In response to a branch prediction inquiry initiated by a user, machine-readable instructions executed by the BTB control circuitry 150 may cause the BTB look-up circuitry 160 to search only the user BTB data portion $170_2$. The machine-readable instructions may additionally prevent the BTB control circuitry 150 and/or BTB look-up circuitry 160 from reading and/or altering branch prediction data stored or otherwise retained in the system BTB data portion $170_1$ in response to the receipt of the branch inquiry initiated by the user application. By preventing an user-level instruction from accessing the system BTB data portion $170_1$, the likelihood of success of user-level side-channel attacks that require preparatory poisoning of the system BTB data portion $170_1$ may be beneficially minimized or prevented.

As depicted in FIG. 1, the CPU 110 may include processor circuitry 120 coupled to processor cache circuitry 130. The CPU 110 may additionally include a BTB 140 having BTB control circuitry 150, BTB look-up circuitry 160; and a plurality of BTB data portions $170_1$-$170_n$. In embodiments, the plurality of BTB data portions 170 may include a system BTB data portion $170_1$ and a user BTB data portion $170_2$. In other embodiments, the plurality of BTB data portions 170 may include any number of BTB data portions $170_1$-$170_n$, each corresponding to a respective one of a corresponding number of "n" contexts executed by the processor circuitry 120. The system 100 may also include one or more storage devices 190. The one or more storage devices 190 may include machine-readable instructions that may be executed by the processor circuitry 120 and/or the BTB look-up circuitry 150.

The CPU 110 includes, but is not limited to, processor circuitry 120, cache circuitry 130, and a BTB 140 that includes BTB control circuitry 150 and BTB look-up circuitry 160. Although not depicted in FIG. 1, the CPU 110 may include other circuitry and/or structures, such as a Translation Look-Aside Buffer (TLB) circuitry, instruction cache circuitry, reorder buffers, and similar. Example CPUs 110 may include, but are not limited to, microprocessors such as Intel Pentium® microprocessor, Intel Core™ Duo processor, Intel Core i3, Intel Core i5, Intel Core i7, AMD Athlon™ processor, AMD Turion™ processor, AMD Sempron™, AMD Ryzen® processor, and ARM Cortex® processors.

The processor circuitry 120 may include any number and/or combination of electrical components, semiconductor devices, and/or logic elements capable of reading and executing machine-readable instruction sets. In embodiments, the processor circuitry 120 may include any number and/or combination of any currently available and/or future developed processors, microprocessors, controllers, and similar. In embodiments, the processor circuitry 120 may include circuitry capable of performing some or all of: generating branch prediction inquiries 122, communicating the branch prediction inquiry 122 to the BTB control circuitry 150, and receiving branch prediction data 124 from the BTB look-up circuitry 150.

The speculative execution of a branch instruction results in the processor circuitry 120 having a plurality of potential execution paths. In such instances, the processor circuitry 120 communicates a branch prediction inquiry 122 to the BTB control circuitry 150. The branch prediction inquiry 122 may include data that identifies the branch instruction. All or a portion of the branch instruction identifier may be used by the BTB control circuitry 150 to identify the initiator of the branch prediction inquiry 122. All or a portion of the branch instruction identifier may be used by the BTB look-up circuitry 160 to determine whether branch prediction data exists within a BTB data portion 170.

Generally, each BTB data portion 170 includes information to predict branches based upon successful prior branch selections. In other words, if the processor circuitry 120 has selected branch "A" rather than branch "B" in response to instruction "C," the BTB look-up circuitry 140 will return a branch prediction of "A" to the processor circuitry 120. In response, the processor circuitry 120 will then speculatively execute the instructions included in branch "A" rather than the instructions included in branch "B." Some classes of side channel attacks "poison" the data included in the a BTB data portion 170 by repeatedly executing a branch instructions that cause changes in the data stored in the BTB data portion 170 such that the attacker is now able to insert malicious code (sometimes referred to as a "gadget") on the predicted branch and cause the processor circuitry to speculatively execute a branch instruction pointing to the code. By causing repeated errors in branch prediction through poisoning or corrupting the data included in one or more BTB data portions 170, an attacker is able to read protected or secret memory locations at the system level on the user's system. By causing repeated errors in branch prediction through poisoning or corrupting the data included in one or more BTB data portions 170 on a client/server system, an attacker is able to read protected or secret memory locations at the system level and at the at the user level of other clients.

The cache circuitry 130 may include any number and/or combination of electrical components, semiconductor devices, and/or logic elements capable of non-persistently storing digital information and/or data. In embodiments, all or a portion of the cache circuitry 130 may be communicably coupled to a single processor circuit 120. In other embodiments, all or a portion of the cache circuitry 130 may be shared between multiple processor circuits 120A-120$n$. In embodiments, the cache circuitry 130 may store information and/or data as a cache line, for example, as a 64 byte cache line.

The BTB 140 includes BTB control circuitry 150 and BTB look-up circuitry 160 that is coupled to a plurality of BTB data portions $170_1$-$170_n$. Each of the BTB data portions 170 includes data representative of branch predictions for a particular user, system, client, or server. For example, the BTB 140 may be apportioned into a system BTB data portion $170_1$ and a user BTB data portion $170_2$. In embodiments, the BTB control circuitry 150 may dynamically apportion the BTB 140 across or among the plurality of BTB data portions $170_1$-$170_n$. For example, if branch prediction inquiries from a first client increase and branch prediction inquiries from the server hosting the first client decrease, the BTB control circuitry 150 may autonomously increase the size of the BTB 140 allocated to the BTB data portion $170_2$ associated with the first client and decrease the size of the BTB 140 allocated to the BTB data portion $170_1$ associated with the server. In embodiments, the apportionment of the BTB 140 may occur dynamically during operation of the CPU 110 responsive to the varying loads presented at the system level and the user level. In some implementations, one or more model specific registers (MSRs) may contain a fixed apportionment of the BTU 140 into the plurality of BTB data portions.

The BTB control circuitry 150 may include any number and/or combination of currently available and/or future developed electrical components, semiconductor devices, and/or logic elements capable of executing machine-readable instruction sets that cause the BTB control circuitry to: receive data associated with the branch prediction inquiry 122 from the processor circuitry 120; determine the initiator of the branch prediction inquiry 122; and provide instructions to the BTB look-up circuitry 160 to selectively search one or more of the plurality of BTB data portions $170_1$-$170_n$ based, at least in part on the initiator of the branch prediction inquiry 122.

The BTB look-up circuitry 160 may include any number and/or combination of currently available and/or future developed electrical components, semiconductor devices, and/or logic elements capable of receiving data associated with the branch prediction inquiry instruction 122 from the processor circuitry 120; determining whether branch prediction data exists; and returning data associated with the branch prediction 124 to the processor circuitry 120.

Although depicted in FIG. 1 as disposed in the CPU 110, in embodiments, the BTB 140 may be disposed external to and coupled to the CPU 110. In embodiments, the BTB 140 may be included as a portion of memory management circuitry that is at least partially disposed in or coupled to the processor circuitry 120. In embodiments, all or a portion of the BTB 140 may be communicably coupled to a single processor circuit 120. In other embodiments, all or a portion of the BTB 140 may be shared between multiple processor circuits 120A-120$n$.

The storage device 190 may include any number and/or combination of currently available and/or future developed electrical components, semiconductor devices, and/or logic elements capable of storing machine-readable instructions that cause the BTB look-up circuitry 150 to determine whether a branch prediction inquiry originated at the system-level or at the user-level. Responsive to determining the branch prediction inquiry represents a system-level branch prediction inquiry, the storage device 190 may include instructions that cause the BTB look-up circuitry 150 to query all or a portion of the first BTB data portion 160 and all or a portion of the second BTB data portion 170 to determine if a branch prediction exists within the BTB 140. Responsive to determining the branch prediction inquiry represents a user-level branch prediction inquiry, the storage device 190 may include instructions that cause the BTB look-up circuitry 150 to query all or a portion of the second BTB data portion 170 to determine if a branch prediction exists within the second BTB data portion 170. Advantageously, the segregation of the system BTB data portion 160 from the user BTB data portion 170 limits the ability of an attacker to detrimentally effect the system BTB data portion 160 of the BTB 140.

In client/server environments, the storage device 190 may include machine-readable instructions that cause the BTB look-up circuitry 150 to determine a specific client system responsible for generating either a system-level branch prediction inquiry or a user-level branch prediction inquiry. The storage device 190 may include machine-readable instructions that cause the BTB look-up circuitry 150 to query all or a portion of the user BTB data portion 170 associated with the client responsible for generating the inquiry responsive to determining that the client generated a user-level branch prediction inquiry. The storage device 190 may include machine-readable instructions that cause the BTB look-up circuitry 150 to query all or a portion of the system-level BTB data portion 160 and all or a portion of the user-level BTB data portion 170 associated with the client responsible for generating the inquiry responsive to determining that the client generated a system-level branch prediction inquiry. Advantageously, the segregation of client-specific branch prediction inquiries minimizes the likelihood that an attacker can misdirect branch predictions on other client systems hosted on a single server.

Figure 2A:
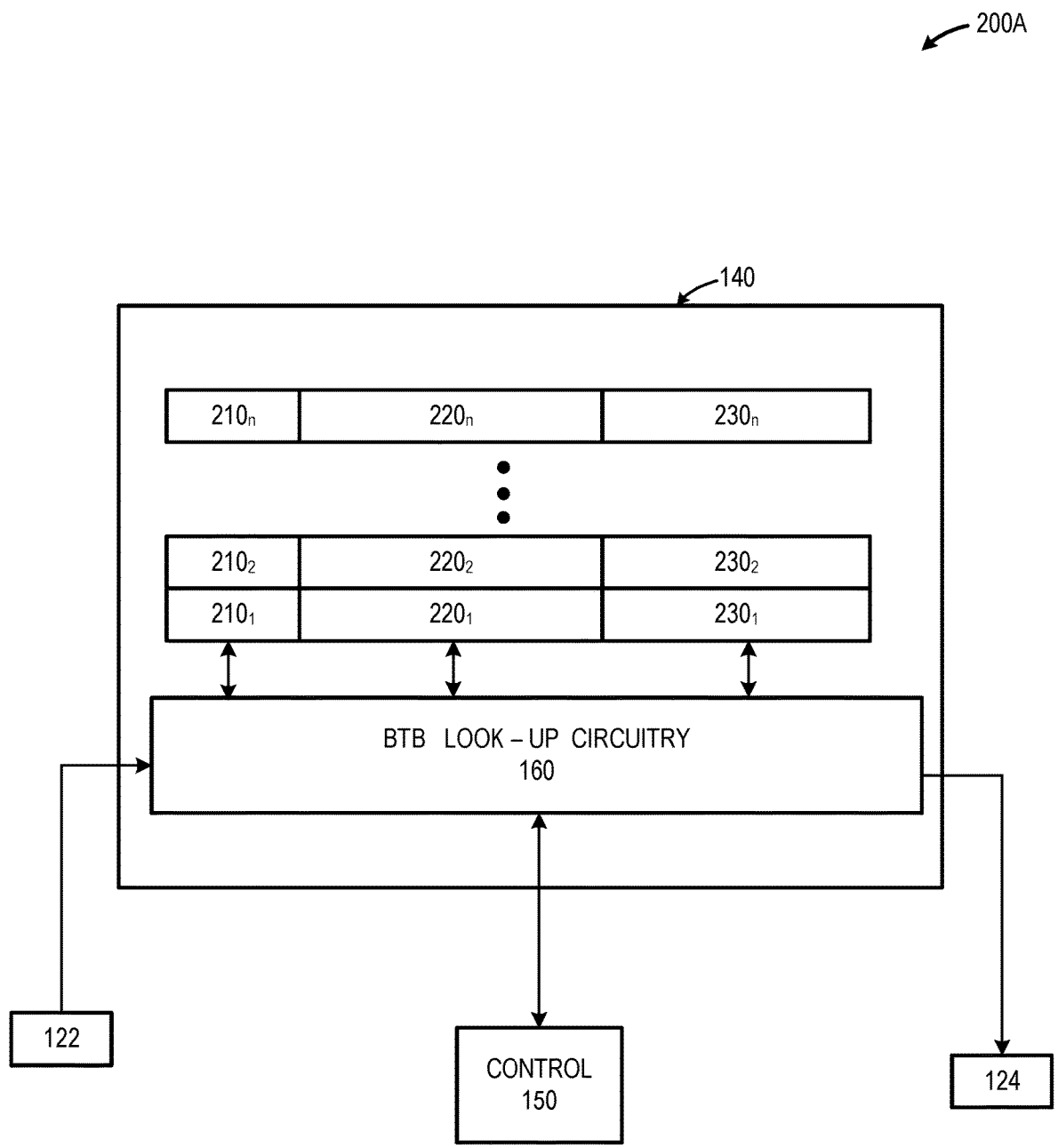
FIG. 2A is a block diagram of an illustrative branch prediction system that includes BTB control circuitry, BTB look-up circuitry, and a BTB in which the system BTB data portion and the user BTB data portion are combined and in which the branch prediction data includes an identifier that designates the branch prediction as a user-level branch prediction or a system level branch prediction, in accordance with at least one embodiment described herein.

FIG. 2A is a block diagram of an illustrative branch prediction system 200A that includes a BTB 141 having BTB control circuitry 150, BTB look-up circuitry 160, and a combined system BTB data portion and user BTB data portion in which each of a plurality of branch predictions includes a respective branch prediction identifier $210_1$-$210_n$ (collectively, "branch prediction identifiers 210") that designates the branch prediction as either a user-level branch prediction or a system level branch prediction, in accordance with at least one embodiment described herein. In embodiments, the processor circuitry 120 communicates a branch prediction inquiry 122 to the BTB look-up circuitry 150. Upon receipt of the branch prediction inquiry 122, the control circuitry 240 identifies the origin of the branch prediction inquiry 122 as either a user-level branch prediction inquiry or a system-level branch prediction inquiry.

In embodiments, responsive to identifying the branch prediction inquiry as a system-level branch prediction inquiry, the control circuitry 240 may cause the BTB look-up circuitry 150 to selectively search only those BTB entries having an identifier 210 designating the associated BTB entry as a system-level branch prediction. In embodiments, responsive to identifying the branch prediction inquiry as a system-level branch prediction inquiry, the control circuitry 240 may cause the BTB look-up circuitry 150 to search all BTB entries. In embodiments, responsive to identifying the branch prediction inquiry as a user-level branch prediction inquiry, the control circuitry 240 may cause the BTB look-up circuitry 150 to selectively search only those BTB entries having an identifier 210 designating the associated BTB entry as a user-level branch prediction. The BTB look-up circuitry 150 then returns data associated with the branch prediction 124 to the processor circuitry 120.

The control circuitry 240 may include any number and/or combination of currently available and/or future developed electronic components, semiconductor devices, and/or logic elements capable of identifying the source (system/user) of a branch inquiry, causing a reset of the BTB look-up circuitry 150, updating the BTB entries based upon branching information received from the processor circuitry 120.

In embodiments, each of the BTB entries may include the identifier field $210_1$-$210_n$ associated with a respective address field $220_1$-$220_n$ (collectively, "address fields 220") and a respective predicted branch field $230_1$-$230_n$ (collectively, "predicted branch fields 230"). In embodiments, the identifier field 210 may be from 1 bit to 8 bits in length. In the simplest implementation, a single bit may be placed in a first logical state (e.g., a logical OFF or "0" state) to indicate the BTB entry is a system-level branch prediction and in a second logical state (e.g., a logical ON or "1" state) to indicate the BTB entry is a user-level branch prediction.

Each of the address fields 220 includes data associated with a branch instruction. In some embodiments, each of the address fields 220 may include at least a portion of a tag or an address that identifies and/or is logically associated with the branch instruction. In embodiments, each of the address fields 220 may include only a partial tag or address to identify the branch instruction. In embodiments, each of the address fields 220 may have any length, such as from 1 byte to 8 bytes in length. In specific embodiments, each of the address fields 220 may have a length of 4 bytes or 8 bytes.

Each of the predicted branch fields 230 includes data associated with the predicted branch address of the next instruction. In embodiments, each of the predicted branch fields 230 may have any length, such as from 1 byte to 16 bytes. In specific embodiments, each of the predicted branch fields 230 may have a length of 4 bytes or 8 bytes.

Figure 2B:
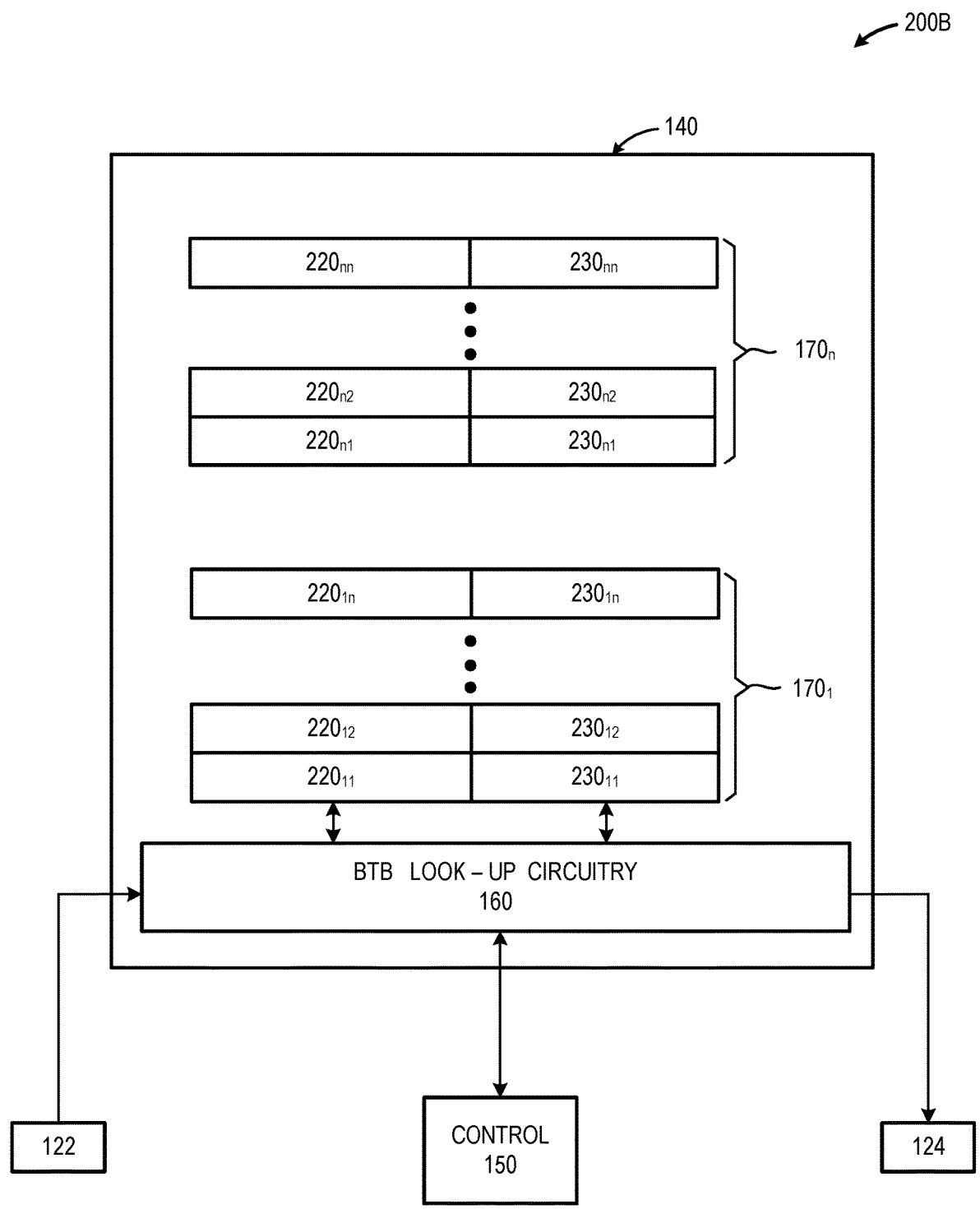
FIG. 2B is a block diagram of another illustrative branch prediction system that includes BTB control circuitry, BTB look-up circuitry, and a BTB that includes a user BTB data portion and a separate system BTB data portion, in accordance with at least one embodiment described herein.

FIG. 2B is a block diagram of another illustrative branch prediction system 200B that includes a BTB 140 having BTB control circuitry 150, BTB look-up circuitry 160, a user BTB data portion $170_1$, and a separate system BTB data portion $170_2$, in accordance with at least one embodiment described herein. In embodiments, the processor circuitry 120 communicates a branch prediction inquiry 122 to the BTB look-up circuitry 150. Upon receipt of the branch prediction inquiry 122, the control circuitry 150 identifies the origin of the branch prediction inquiry 122 as either a user-level branch prediction inquiry or a system-level branch prediction inquiry. In embodiments, responsive to identifying the branch prediction inquiry as a system-level branch prediction inquiry, the control circuitry 240 may cause the BTB look-up circuitry 160 to selectively search only the system BTB data portion 160.

In embodiments, responsive to identifying the branch prediction inquiry as a system-level branch prediction inquiry, the control circuitry 240 may cause the BTB look-up circuitry 150 to search both the system BTB data portion 160 and the user BTB data portion 170. In embodiments, responsive to identifying the branch prediction inquiry as a user-level branch prediction inquiry, the control circuitry 240 may cause the BTB look-up circuitry 150 to selectively search only the user BTB data portion 170. The BTB look-up circuitry 150 then returns data associated with the branch prediction 124 to the processor circuitry 120.

In embodiments, each of the entries included in the system BTB data portion 160 may include an address field $220_{11}$-$220_{1n}$ (collectively, "system address field $220_{1x}$"), and a predicted branch field $230_{11}$-$230_{1n}$ (collectively, "system predicted branch field $230_{1x}$").

The system address field $220_{1x}$ includes data associated with the branch instruction. In some embodiments, the system address field $220_{1x}$ may include at least a portion of a tag or an address that identifies and/or is logically associated with the branch instruction. In embodiments, the system address field $220_{1x}$ may include only a partial tag or address to identify the branch instruction. In embodiments, the system address field $220_{1x}$ may have any length, such as from 1 byte to 8 bytes in length. In specific embodiments, the system address field $220_{1x}$ may have a length of 4 bytes or 8 bytes.

The system predicted branch field $230_{1x}$ includes data associated with the predicted branch address of the next instruction. In embodiments, the system predicted branch field $230_{1x}$ may have any length, such as from 1 byte to 16 bytes. In specific embodiments, the system predicted branch field $230_{1x}$ may have a length of 4 bytes or 8 bytes.

In embodiments, each of the entries included in the user BTB data portion 170 may include an user address field $220_{21}$-$220_{2n}$ (collectively, "user address field $220_{2x}$"), and an user predicted branch field $230_{21}$-$230_{2n}$ (collectively, "user predicted branch field $230_{2x}$").

The user address field $220_{2x}$ includes data associated with the branch instruction. In some embodiments, the user address field $220_{2x}$ may include at least a portion of a tag or an address that identifies and/or is logically associated with the branch instruction. In embodiments, the user address field $220_{2x}$ may include only a partial tag or address to identify the branch instruction. In embodiments, the user address field $220_{2x}$ may have any length, such as from 1 byte to 8 bytes in length. In specific embodiments, the user address field $220_{2x}$ may have a length of 4 bytes or 8 bytes.

The user predicted branch field $230_{2x}$ includes data associated with the predicted branch address of the next instruction. In embodiments, the user predicted branch field $230_{2x}$ may have any length, such as from 1 byte to 16 bytes. In specific embodiments, the user predicted branch field $230_{2x}$ may have a length of 4 bytes or 8 bytes.

Figure 3A:
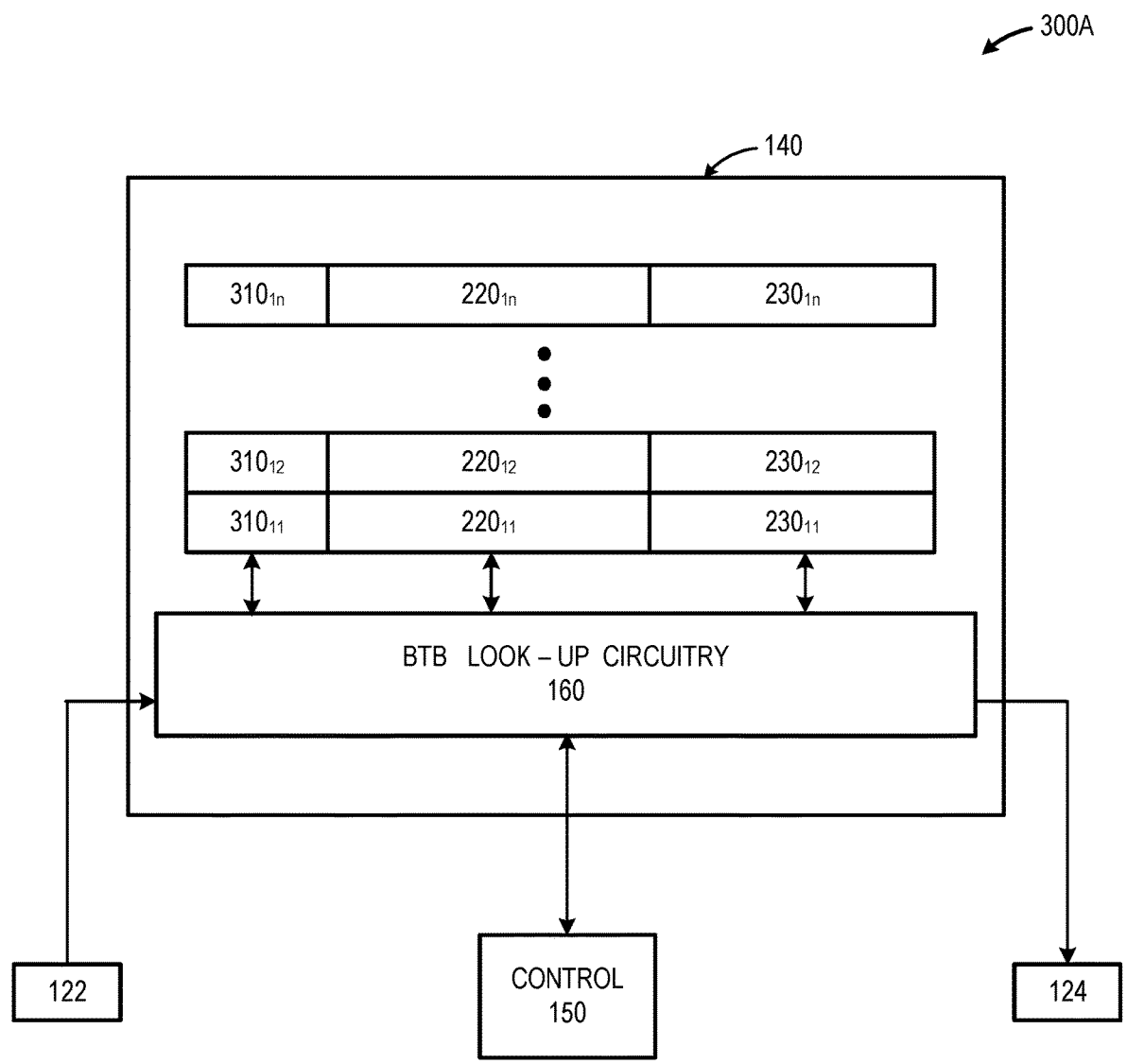
FIG. 3A is a block diagram of another illustrative branch prediction system that includes BTB control circuitry, BTB look-up circuitry, and a BTB in which branch prediction data for each of a plurality of clients are combined and in which the branch prediction data includes an identifier, such as a Process Context Identifier (PCID), that designates the client associated with the branch prediction, in accordance with at least one embodiment described herein.

FIG. 3A is a block diagram of another illustrative branch prediction system 300A that includes a BTB 140 having BTB control circuitry 150, BTB look-up circuitry 160, and a combined BTB that includes branch prediction data for each of a plurality of clients and in which the each branch prediction includes an identifier $310_1$-$310_n$ (collectively, "identifiers 310"), such as a Process Context Identifier (PCID), that designates the client associated with the respective branch prediction, in accordance with at least one embodiment described herein. In some implementations, each of the identifiers may include a Process Context Identifier (PCID). In embodiments, the processor circuitry 120 communicates a branch prediction inquiry 122 to the BTB look-up circuitry 150. Upon receipt of the branch prediction inquiry 122, the control circuitry 240 identifies the origin of the branch prediction inquiry 122 as either a user-level branch prediction inquiry or a system-level branch prediction inquiry.

In embodiments, responsive to identifying the branch prediction inquiry as a system-level branch prediction inquiry, the control circuitry 240 may cause the BTB look-up circuitry 150 to selectively search only those BTB entries having an identifier 310 designating the associated BTB entry as a system-level branch prediction. In embodiments, responsive to identifying the branch prediction inquiry as a system-level branch prediction inquiry, the control circuitry 240 may cause the BTB look-up circuitry 150 to search all BTB entries. In embodiments, responsive to identifying the branch prediction inquiry as a user-level branch prediction inquiry, the control circuitry 240 may cause the BTB look-up circuitry 150 to selectively search only those BTB entries having an identifier 210 designating the associated BTB entry as a user-level branch prediction. The BTB look-up circuitry 150 then returns data associated with the branch prediction 124 to the processor circuitry 120.

In embodiments, each of the BTB entries may include the identifier field $310_1$-$310_n$ associated with a respective address field $220_1$-$220_n$ (collectively, "address fields 220") and a respective predicted branch field $230_1$-$230_n$ (collectively, "predicted branch fields 230"). In embodiments, the identifier field 310 may be from 8 bits to 32 bits in length. In at least one embodiments, the identifier field 310 may include a 12-bit Process Context Identifier (PCID).

Each of the address fields 220 includes data associated with a branch instruction. In some embodiments, each of the address fields 220 may include at least a portion of a tag or an address that identifies and/or is logically associated with the branch instruction. In embodiments, each of the address fields 220 may include only a partial tag or address to identify the branch instruction. In embodiments, each of the address fields 220 may have any length, such as from 1 byte to 8 bytes in length. In specific embodiments, each of the address fields 220 may have a length of 4 bytes or 8 bytes.

Each of the predicted branch fields 230 includes data associated with the predicted branch address of the next instruction. In embodiments, each of the predicted branch fields 230 may have any length, such as from 1 byte to 16 bytes. In specific embodiments, each of the predicted branch fields 230 may have a length of 4 bytes or 8 bytes.

Figure 3B:
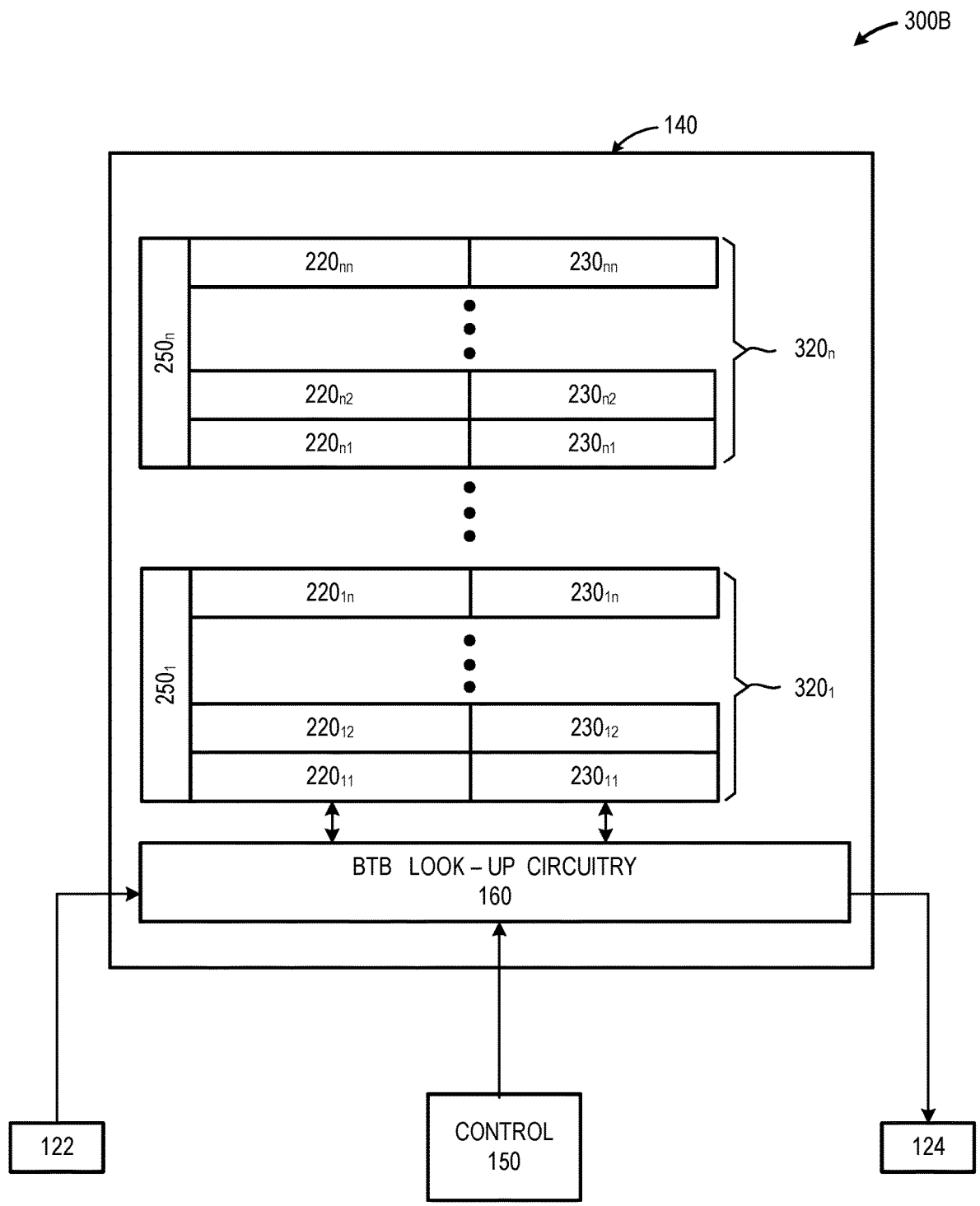
FIG. 3B is a block diagram of another illustrative branch prediction system that includes BTB control circuitry, BTB look-up circuitry, and a BTB that includes a plurality of BTB data portions, each associated with a respective client included in a plurality of clients, in accordance with at least one embodiment described herein.

FIG. 3B is a block diagram of another illustrative branch prediction system 300B that includes a BTB 140 having BTB control circuitry 150, BTB look-up circuitry 160, and a plurality of BTB data portions $320_1$-$320_n$ (collectively, "BTB data portions 320"), each associated with a respective client included in a plurality of clients, in accordance with at least one embodiment described herein. In embodiments, the processor circuitry 120 communicates a branch prediction inquiry 122 to the BTB look-up circuitry 150. Upon receipt of the branch prediction inquiry 122, the control circuitry 240 identifies the origin of the branch prediction inquiry 122 based on the identifier (e.g., PCID) associated with the branch prediction inquiry. In embodiments, responsive to identifying the origin of the branch prediction inquiry, the control circuitry 240 may cause the BTB look-up circuitry 150 to selectively search only the BTB data portion 320 corresponding to the origin of the branch prediction inquiry. BTB look-up circuitry 160 can use origin of branch instruction and compare it with values in a branch origin field $250_1$-$250_n$ to determine the appropriate data portion $320_1$-$320_n$ to use for branch prediction.

In embodiments, each of the branch prediction entries included in each of the BTB data portions 320 may include an address field $220_{11}$-$220_n$ (collectively, "system address field $220_{1x}$"), and a predicted branch field $230_{11}$-$230_{1n}$ (collectively, "system predicted branch field $230_{1x}$").

Figure 4:
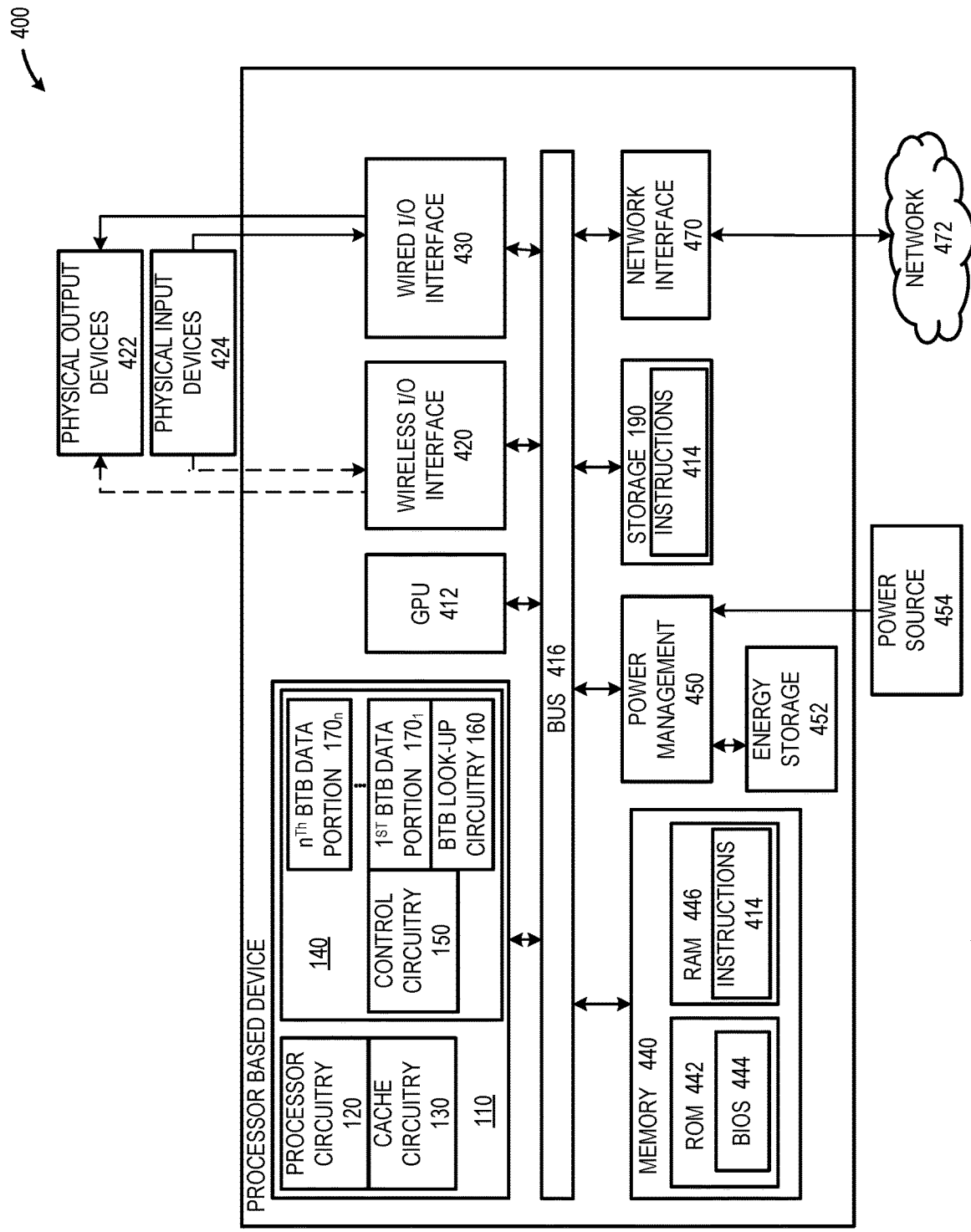
FIG. 4 is a schematic diagram of an illustrative electronic, processor-based, device that includes a CPU having processor circuitry, cache circuitry, and a BTB that includes control circuitry, BTB look-up circuitry, and a plurality of BTB data portions, in accordance with at least one embodiment described herein.

FIG. 4 is a schematic diagram of an illustrative electronic, processor-based, device 400 that includes a CPU 110 having processor circuitry 120, cache circuitry 130, and BTB circuitry 140 that includes control circuitry 150, BTB look-up circuitry 160, and a plurality of BTB data portions $170_1$-$170_n$, in accordance with at least one embodiment described herein. Each of the plurality of BTB data portions 170 may include branch prediction data associated with a particular logical entity, such as a system, a user, or a client. In some embodiments, the plurality of BTB data portions 170 may include two BTB data portions $170_1$ and $170_2$—a system BTB data portion $170_1$ and a user BTB data portion $170_2$. In some embodiments, the plurality of BTB data portions 170 may include a larger number of data portions $170_1$-$170_n$, each corresponding to a single Process Context Identifier (PCID). In some implementations, some or all of the BTB data portions 170 may be disposed in a common memory portion, data structure, data store, or database and each of the branch prediction entries may have an identifier designating the BTB data portion associated with the respective entry. In some implementations, some or all of the BTB data portions $170_1$-$170_n$ may be disposed in a separate memory portions, data structures, data stores, or databases. The segregation of the branch prediction data into portions beneficially improves system security since the control circuitry 150 causes the BTB look-up circuitry 160 to search only those branch predictions associated with a particular branch prediction inquiry. For example, in response to receipt of a system level branch prediction inquiry, the control circuitry 150 may cause the BTB look-up circuitry 160 may search for branch prediction information in both the system BTB data structure $170_1$ and the user BTB data structure $170_2$. In another example, in response to receipt of a user-level branch prediction inquiry originating from a first client the control circuitry 150 may cause the BTB look-up circuitry 160 to search only the BTB data portion 170 associated with the first client.

The processor-based device 400 may additionally include one or more of the following: a graphical processing unit 412, a wireless input/output (I/O) interface 420, a wired I/O interface 430, main memory 440, power management circuitry 450, a non-transitory storage device 190, and a network interface 470. The following discussion provides a brief, general description of the components forming the illustrative processor-based device 400. Example, non-limiting processor-based devices 400 may include, but are not limited to: smartphones, wearable computers, portable computing devices, handheld computing devices, desktop computing devices, blade server devices, workstations, and similar.

The processor-based device 400 includes a CPU 110 having processor circuitry 120 and a BTB 140 that includes control circuitry 150, BTB look-up circuitry 160, and a plurality of BTB data portions $170_1$-$170_n$. At least a portion of the machine-readable instruction sets 414 cause the control circuitry 150 to determine the origin of each of the branch prediction inquiries $122_1$-$122_n$ received by the BTB 140. At least a portion of the machine-readable instruction sets 414 cause the control circuitry 150 to cause the BTB look-up circuitry 160 to selectively search one or more BTB data portions 170 based, at least in part, on the origin of a branch prediction inquiry 122. In instances where the BTB look-up circuitry 160 successfully retrieves a branch prediction from a BTB data portion 170, the BTB look-up circuitry returns the prediction data 124 to the processor circuitry 120.

In some embodiments, the processor-based device 400 includes graphics processor circuitry 412 capable of executing machine-readable instruction sets 414 and generating an output signal capable of providing a display output to a system user. Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 120 may include any number of hardwired or configurable circuits, some or all of which may include programmable and/or configurable combinations of electronic components, semiconductor devices, and/or logic elements that are disposed partially or wholly in a PC, server, or other computing system capable of executing processor-readable instructions.

The processor-based device 400 includes a bus or similar communications link 416 that communicably couples and facilitates the exchange of information and/or data between various system components including the processor circuitry 120, the graphics processor circuitry 412, one or more wireless I/O interfaces 420, one or more wired I/O interfaces 430, the system memory 440, one or more non-transitory storage devices 190, and/or one or more network interfaces 470. The processor-based device 400 may be referred to in the singular herein, but this is not intended to limit the embodiments to a single processor-based device 400, since in certain embodiments, there may be more than one processor-based device 400 that incorporates, includes, or contains any number of communicably coupled, collocated, or remote networked circuits or devices.

The processor circuitry 120 may include any number, type, or combination of currently available or future developed devices capable of executing machine-readable instruction sets. The processor circuitry 120 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 4 are of conventional design. Consequently, such blocks need not be described in further detail herein, as they will be understood by those skilled in the relevant art. The bus 416 that interconnects at least some of the components of the processor-based device 400 may employ any currently available or future developed serial or parallel bus structures or architectures.

The system memory 440 may include read-only memory ("ROM") 442 and random access memory ("RAM") 446. A portion of the ROM 442 may be used to store or otherwise retain a basic input/output system ("BIOS") 444. The BIOS 444 provides basic functionality to the processor-based device 400, for example by causing the processor circuitry 120 to load and/or execute one or more machine-readable instruction sets 414. In embodiments, at least some of the one or more machine-readable instruction sets 414 cause at least a portion of the processor circuitry 120 to provide, create, produce, transition, and/or function as a dedicated, specific, and particular machine, for example a word processing machine, a digital image acquisition machine, a media playing machine, a gaming system, a communications device, a smartphone, or similar.

The processor-based device 400 may include at least one wireless input/output (I/O) interface 420. The at least one wireless I/O interface 420 may be communicably coupled to one or more physical output devices 422 (tactile devices, video displays, audio output devices, hardcopy output devices, etc.). The at least one wireless I/O interface 420 may communicably couple to one or more physical input devices 424 (pointing devices, touchscreens, keyboards, tactile devices, etc.). The at least one wireless I/O interface 420 may include any currently available or future developed wireless I/O interface. Example wireless I/O interfaces include, but are not limited to: BLUETOOTH®, near field communication (NFC), and similar.

The processor-based device 400 may include one or more wired input/output (I/O) interfaces 430. The at least one wired I/O interface 430 may be communicably coupled to one or more physical output devices 422 (tactile devices, video displays, audio output devices, hardcopy output devices, etc.). The at least one wired I/O interface 430 may be communicably coupled to one or more physical input devices 424 (pointing devices, touchscreens, keyboards, tactile devices, etc.). The wired I/O interface 430 may include any currently available or future developed I/O interface. Example wired I/O interfaces include, but are not limited to: universal serial bus (USB), IEEE 1394 ("FireWire"), and similar.

The processor-based device 400 may include one or more communicably coupled, non-transitory, data storage devices 190. The data storage devices 190 may include one or more hard disk drives (HDDs) and/or one or more solid-state storage devices (SSDs). The one or more data storage devices 190 may include any current or future developed storage appliances, network storage devices, and/or systems. Non-limiting examples of such data storage devices 190 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some implementations, the one or more data storage devices 190 may include one or more removable storage devices, such as one or more flash drives, flash memories, flash storage units, or similar appliances or devices capable of communicable coupling to and decoupling from the processor-based device 400.

The one or more data storage devices 190 may include interfaces or controllers (not shown) communicatively coupling the respective storage device or system to the bus 416. The one or more data storage devices 190 may store, retain, or otherwise contain machine-readable instruction sets, data structures, program modules, data stores, databases, logical structures, and/or other data useful to the processor circuitry 120 and/or graphics processor circuitry 412 and/or one or more applications executed on or by the processor circuitry 120 and/or graphics processor circuitry 412. In some instances, one or more data storage devices 190 may be communicably coupled to the processor circuitry 120, for example via the bus 416 or via one or more wired communications interfaces 430 (e.g., Universal Serial Bus or USB); one or more wireless communications interfaces 420 (e.g., Bluetooth®, Near Field Communication or NFC); and/or one or more network interfaces 470 (IEEE 802.3 or Ethernet, IEEE 802.11, or WiFi®, etc.).

Processor-readable instruction sets 414 and other programs, applications, logic sets, and/or modules may be stored in whole or in part in the system memory 440. Such instruction sets 414 may be transferred, in whole or in part, from the one or more data storage devices 190. The instruction sets 414 may be loaded, stored, or otherwise retained in system memory 440, in whole or in part, during execution by the processor circuitry 120 and/or graphics processor circuitry 412. The processor-readable instruction sets 414 may include machine-readable and/or processor-readable code, instructions, or similar logic capable of causing the BTB control circuitry 150 to cause the BTB look-up circuitry 160 to selectively search one or more BTB data portions $170_1$-$170_n$ for a branch prediction based, at least in part, on the origin of a particular branch prediction inquiry 122. For example, the BTB control circuitry 150 may cause the BTB look-up circuitry 160 to selectively search a user BTB data portion $170_1$ in response to receipt of a user-level branch prediction inquiry 122. In another example, the BTB control circuitry 150 may cause the BTB look-up circuitry 160 to selectively search a user BTB data portion $170_1$ and a system BTB data portion $170_2$ in response to receipt of a system-level branch prediction inquiry 122. In another example, the BTB control circuitry 150 may cause the BTB look-up circuitry 160 to selectively search a BTB data portion $170_1$ associated with a first client in response to receipt of a user-level branch prediction inquiry 122 from the first client.

The processor-based device 400 may include power management circuitry 450 that controls one or more operational aspects of the energy storage device 452. In embodiments, the energy storage device 452 may include one or more primary (i.e., non-rechargeable) or secondary (i.e., rechargeable) batteries or similar energy storage devices. In embodiments, the energy storage device 452 may include one or more supercapacitors or ultracapacitors. In embodiments, the power management circuitry 450 may alter, adjust, or control the flow of energy from an external power source 454 to the energy storage device 452 and/or to the processor-based device 400. The power source 454 may include, but is not limited to, a solar power system, a commercial electric grid, a portable generator, an external energy storage device, or any combination thereof.

For convenience, the processor circuitry 120, the graphics processor circuitry 412, the wireless I/O interface 420, the wired I/O interface 430, the system memory 440, the power management circuitry 450, the storage device 190, and the network interface 470 are illustrated as communicatively coupled to each other via the bus 416, thereby providing connectivity between the above-described components. In alternative embodiments, the above-described components may be communicatively coupled in a different manner than illustrated in FIG. 4. For example, one or more of the above-described components may be directly coupled to other components, or may be coupled to each other, via one or more intermediary components (not shown). In some embodiments, all or a portion of the bus 416 may be omitted and the components are coupled directly to each other using suitable wired or wireless connections.

Figure 5:
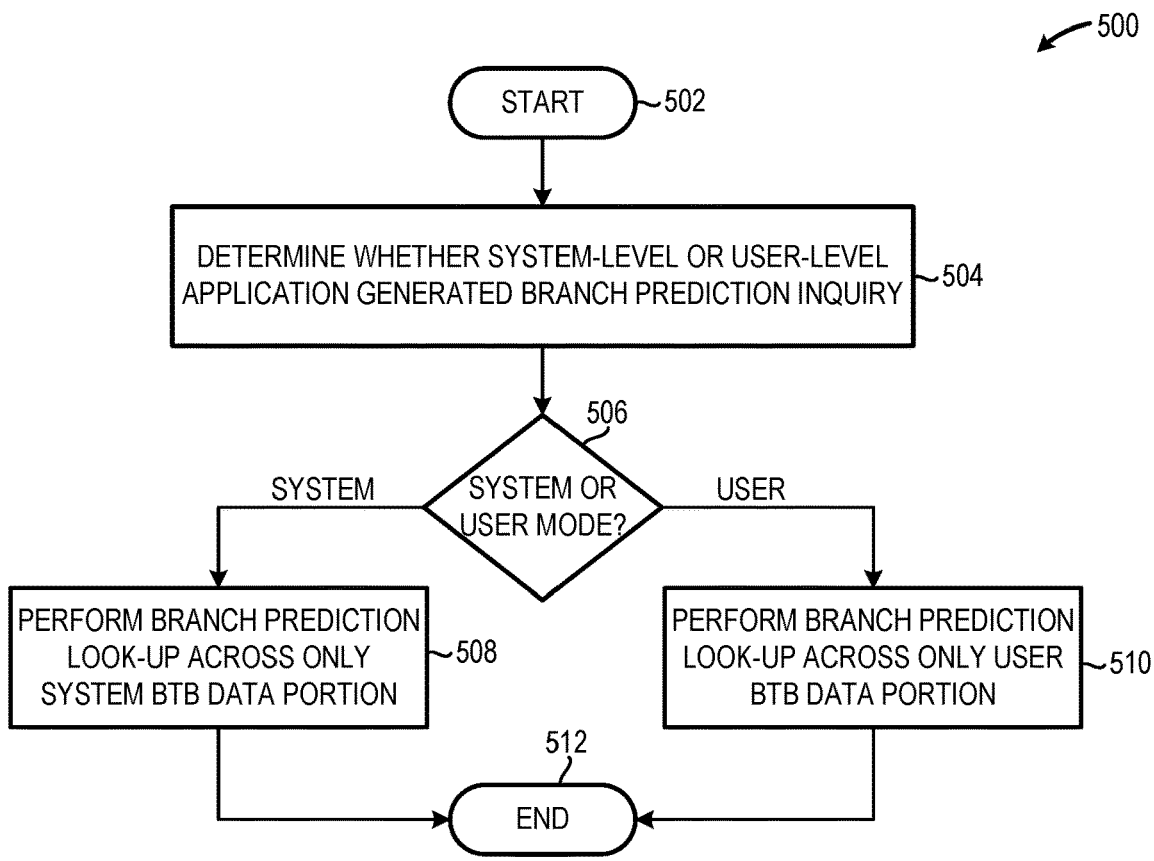
FIG. 5 is a high-level block flow diagram of an illustrative method of performing a selective BTB look-up using BTB control circuitry and a BTB apportioned into a plurality of BTB data portions, in accordance with at least one embodiment described herein.

FIG. 5 is a high-level block flow diagram of an illustrative method 500 of performing a selective BTB look-up using BTB control circuitry 150 and a BTB 140 apportioned into a plurality of BTB data portions $170_1$-$170_n$, in accordance with at least one embodiment described herein. A class of side channel attacks use branch misprediction or poison the BTB such that a gadget created by the attacker is repeatedly executed. Both attacks typically occur at the user-level and attempt to read data from protected memory, such as kernel memory or other client's memory (multi-client systems). By restricting the ability of user-level applications to access portions of the BTB reserved for system-level branch predictions and/or other client branch predictions, system security and protection against side channel attacks such as Spectre are beneficially increased. The method 500 commences at 502.

At 504, the BTB control circuitry 150 determines the origin of a received branch prediction inquiry 122. In embodiments, the BTB control circuit 150 may determine whether the received branch prediction inquiry 122 originated as a user-level branch prediction inquiry or a system-level branch prediction inquiry.

At 506, the BTB control circuitry 150 determines whether the branch prediction inquiry originated as a system or user mode inquiry. If the BTB control circuitry 150 determines the inquiry originated at the system level, the method 500 continues at 508. If the BTB control circuitry 150 determines the inquiry originated at the user level, the method 500 continues at 510.

At 508, responsive to a determination that the branch prediction inquiry 122 originated at the system level, the BTB control circuitry 150 causes the BTB look-up circuitry 160 to selectively search at least the system BTB data portion 170. In embodiments, responsive to a determination that the branch prediction inquiry 122 originated at the system level, the BTB control circuitry 150 may cause the BTB look-up circuitry 160 to selectively search one or more user BTB data portions 170 in addition or alternative to the system BTB data portion. The method 500 concludes at 512.

At 510, responsive to a determination that the branch prediction inquiry 122 originated at the user level, the BTB control circuitry 150 causes the BTB look-up circuitry 160 to selectively search the respective user BTB data portion 170. The method 500 concludes at 512.

Figure 6:
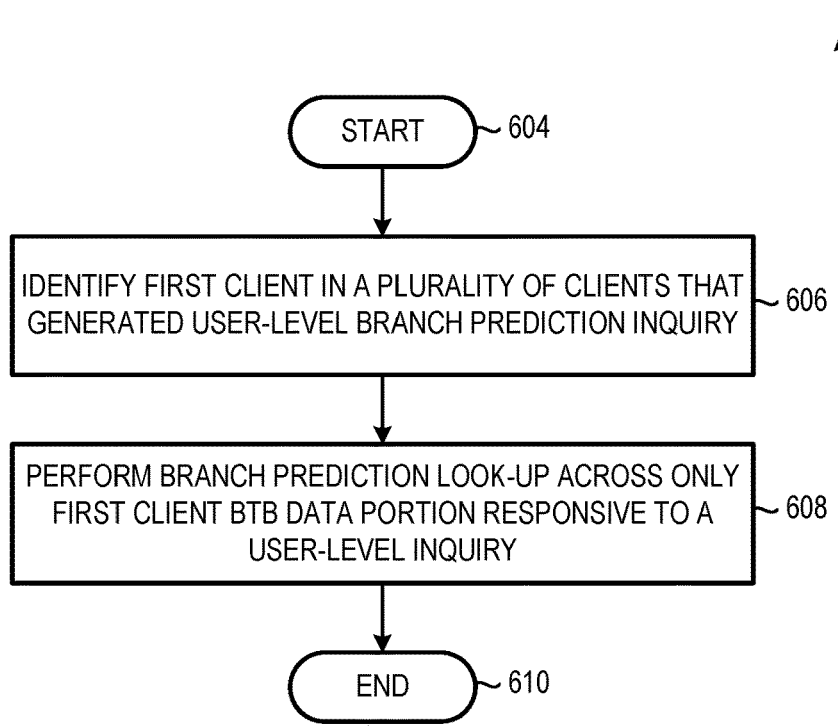
FIG. 6 is a high-level block flow diagram of an illustrative method of performing a selective BTB look-up using BTB control circuitry and a BTB apportioned into a plurality of BTB data portions, in accordance with at least one embodiment described herein; and Although the following Detailed Description will proceed with reference being made to illustrative embodiments, many alternatives, modifications and variations thereof will be apparent to those skilled in the art.

FIG. 6 is a high-level block flow diagram of an illustrative method 600 of performing a selective BTB look-up using BTB control circuitry 150 and a BTB 140 apportioned into a plurality of BTB data portions $320_1$-$320_n$, in accordance with at least one embodiment described herein. In embodiments, each client on a multi-client system containing "n" clients may have a branch origin field $250_1$-$250_n$, such as a PCID or similar unique identifier, associated with a respective BTB data portion $320_1$-$320_n$. The method 600 commences at 602.

At 604, the BTB control circuitry 150 determines the origin of a received branch prediction inquiry 122. In embodiments, the BTB control circuitry 150 may determine the origin of the branch prediction inquiry 122 using all or a portion of the data included in the branch origin field $250_1$-$250_n$. In embodiments, the BTB control circuit 150 may determine which client generated the received branch prediction inquiry 122 and whether the inquiry originated as a user-level branch prediction inquiry or a system-level branch prediction inquiry.

At 606, the BTB control circuitry 150 causes the BTB look-up circuitry 160 to selectively search one or more BTB data portions $170_1$-$170_n$ based, at least in part, on the identity of the branch prediction inquiry initiator. For example, the BTB control circuitry 150 may cause the BTB look-up circuitry 160 to search only the BTB data portion 170 associated with the client generating the branch prediction inquiry 122. The method 600 concludes at 608.

While FIGS. 5 and 6 illustrate various operations according to one or more embodiments, it is to be understood that not all of the operations depicted in FIGS. 5 and 6 are necessary for other embodiments. Indeed, it is fully contemplated herein that in other embodiments of the present disclosure, the operations depicted in FIGS. 5 and 6, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for mitigating or eliminating the effectiveness of a side channel attack, such as a Spectre type attack, by limiting the ability of a user-level branch prediction inquiry to access system-level branch prediction data. The branch prediction data stored in the BTB may be apportioned into a plurality of BTB data portions. BTB control circuitry identifies the initiator of a received branch prediction inquiry. Based on the identity of the branch prediction inquiry initiator, the BTB control circuitry causes BTB look-up circuitry to selectively search one or more of the plurality of BTB data portions.

The following examples pertain to further embodiments. The following examples of the present disclosure may comprise subject material such as at least one device, a method, at least one machine-readable medium for storing instructions that when executed cause a machine to perform acts based on the method, means for performing acts based on the method and/or a system for causing BTB look-up circuitry to perform a selective search across one or more BTB data portions based on the branch prediction initiator.

According to example 1, there is provided a branch prediction system. The system may include: processor circuitry; Branch Target Buffer (BTB) circuitry coupled to the processor circuitry, the BTB circuitry including at least one system BTB data portion and at least one user BTB data portion; BTB control circuitry; BTB look-up circuitry coupled to the BTB control circuitry and the BTB circuitry; and a storage device coupled to the BTB control circuitry, the storage device including machine-readable instructions that, when executed by the BTB control circuitry, cause the BTB-control circuitry to: identify an initiator of a received branch prediction inquiry as a system level initiated branch prediction inquiry or a user level initiated branch prediction inquiry; and cause the BTB look-up circuitry to perform a branch prediction lookup using the respective at least one user BTB data portion associated with the user level inquiry initiator responsive to identification of the received branch prediction inquiry as an user level initiated branch prediction inquiry.

Example 2 may include elements of example 1 where the machine-readable instructions may cause the BTB control circuitry to: cause the BTB look-up circuitry to perform a branch prediction lookup using the system BTB data portion responsive to identification of the received branch prediction inquiry as a system level branch prediction inquiry.

Example 3 may include elements of any of examples 1 or 2 where the machine-readable instructions may cause the BTB control circuitry to update at least one of: a record included in the at least one user level BTB portion to include branch address information and, responsive to a user level branch prediction inquiry, information indicative of an initiator of the user level branch prediction inquiry; or a record included in the at least one system level BTB portion to include branch address information and, responsive to a system level branch prediction inquiry, information indicative of an initiator of the system level branch prediction inquiry.

Example 4 may include elements of any of examples 1 through 3 where the system comprises a server-based system hosting a plurality of clients; and where the machine-readable instructions that cause the BTB control circuitry to identify the initiator of the received branch prediction inquiry as a system-level or a user-level branch prediction inquiry cause the BTB control circuitry to: identify a first client responsible for initiating the branch prediction inquiry; and where the machine-readable instructions that cause the BTB control circuitry to cause the BTB look-up circuitry to perform a branch prediction lookup using the respective at least one user BTB data portion associated with the user-level inquiry initiator responsive to identification of the received branch prediction inquiry as user-level initiated branch prediction inquiry cause the BTB look-up circuitry to: perform a branch prediction lookup using the respective at least one BTB data portion associated with the first client responsive to identification of the received user-level branch prediction inquiry as a branch prediction inquiry generated by the first client.

Example 5 may include elements of any of examples 1 through 5 where the machine-readable instructions may cause the BTB look-up circuitry to: perform a branch prediction lookup using a system level BTB data portion responsive to identification of the received branch prediction inquiry as a system-level branch prediction inquiry.

Example 6 may include elements of any of examples 1 through 5 where the machine-readable instructions that cause the BTB look-up circuitry to identify the initiator of the received branch prediction inquiry as a system-level or a user-level branch prediction inquiry may cause the BTB control circuitry to: identify the first client using a unique identifier associated with the first client.

Example 7 may include elements of any of examples 1 through 6 where the machine-readable instructions that cause the BTB look-up circuitry to identify the initiator of the received branch prediction inquiry as a system-level or a user-level branch prediction inquiry may cause the BTB control circuitry to: identify whether the received branch prediction inquiry includes a system level BTB inquiry or a user level BTB inquiry using an identifier associated with the received branch prediction inquiry.

According to example 8, there is provided a branch prediction method. The method may include: identifying, by Branch Target Buffer (BTB) control circuitry, whether a received branch prediction inquiry includes a system-level branch prediction inquiry or a user-level branch prediction inquiry; and performing, by BTB look-up circuitry coupled to the BTB control circuitry, a branch prediction lookup using the respective at least one user BTB data portion associated with the user level inquiry initiator responsive to identification of the received branch prediction inquiry as an user level initiated branch prediction inquiry.

Example 9 may include elements of example 8 and the method may further include: performing, by the BTB look-up circuitry, a branch prediction lookup using a system BTB data portion responsive to identification of the received branch prediction inquiry by the BTB control circuitry as a system level branch prediction inquiry.

Example 10 may include elements of any of examples 8 or 9 and the method may further include: causing the BTB control circuitry to update at least one of: a record included in the at least one user level BTB portion to include branch address information and, responsive to a user level branch prediction inquiry, information indicative of an initiator of the user level branch prediction inquiry; or a record included in the at least one system level BTB portion to include branch address information and, responsive to a system level branch prediction inquiry, information indicative of an initiator of the system level branch prediction inquiry.

Example 11 may include elements of any of examples 8 through 10 and the method may further include: identifying, by the BTB control circuitry, a first client responsible for generating the branch prediction inquiry; where performing a branch prediction lookup using the respective at least one user BTB data portion associated with the user level inquiry initiator responsive to identification of the received branch prediction inquiry as an user level initiated branch prediction inquiry includes: performing, by the BTB look-up circuitry, a branch lookup using the respective at least one user BTB data portion associated with the first client responsive to identification of the received branch prediction inquiry as an user level initiated branch prediction inquiry generated by the first client.

Example 12 may include elements of any of examples 8 through 11 and the method may additionally include: performing, by the BTB look-up circuitry, a branch lookup using a system BTB data portion responsive to identification of the received branch prediction inquiry as a system level branch prediction inquiry.

Example 13 may include elements of any of examples 8 through 12 where identifying a first client responsible for generating the branch prediction inquiry may include: identifying, by the BTB control circuitry, the first client using a unique identifier associated with the first client.

Example 14 may include elements of any of examples 8 through 13 where identifying whether a received branch prediction inquiry includes a system level branch prediction inquiry or user level branch prediction inquiry may include: identifying whether the received branch prediction inquiry includes a system level branch prediction inquiry or user level branch prediction inquiry using an identifier associated with the received branch prediction inquiry.

Example 15 may include elements of any of examples 8 through 14 where identifying whether the received branch prediction inquiry includes a system level branch prediction inquiry or user level branch prediction inquiry using an identifier associated with the received branch prediction inquiry may include: identifying whether the received branch prediction inquiry includes a system level branch prediction inquiry or user level branch prediction inquiry using a Current Privilege Level (CPL) associated with the received branch prediction inquiry.

According to example 16, there is provided a non-transitory machine-readable storage medium that includes instructions, that when executed by Branch Target Buffer (BTB) control circuitry, cause the BTB control circuitry to: identify whether a received branch prediction inquiry includes a system level branch prediction inquiry or a user level branch prediction inquiry; and cause communicably coupled BTB look-up circuitry to perform a branch prediction lookup using the respective at least one user BTB data portion associated with the user level inquiry initiator responsive to identification of the received branch prediction inquiry as an user level initiated branch prediction inquiry.

Example 17 may include elements of example 16 where the machine-readable instructions may cause the BTB control circuitry to: cause the BTB look-up circuitry to perform a branch prediction lookup using a system BTB data portion responsive to identification of the received branch prediction inquiry by the BTB control circuitry as a system level branch prediction inquiry.

Example 18 may include elements of any of examples 16 or 17 where the machine-readable instructions may cause the BTB control circuitry to update at least one of: a record included in the at least one user level BTB portion to include branch address information and, responsive to a user level branch prediction inquiry, information indicative of an initiator of the user level branch prediction inquiry; or a record included in the at least one system level BTB portion to include branch address information and, responsive to a system level branch prediction inquiry, information indicative of an initiator of the system level branch prediction inquiry.

Example 19 may include elements of any of examples 16 through 18 where the machine-readable instructions may cause the BTB control circuitry to: identify a first client responsible for generating the branch prediction inquiry; where the machine-readable instructions that cause the BTB control circuitry to cause the BTB look-up circuitry to perform the branch prediction lookup using the respective at least one user BTB data portion associated with the user level inquiry initiator responsive to identification of the received branch prediction inquiry as an user level initiated branch prediction inquiry may cause the BTB control circuitry to: cause the BTB look-up circuitry to perform a branch lookup using the respective at least one user BTB data portion associated with the first client responsive to identification of the received branch prediction inquiry as an user level initiated branch prediction inquiry generated by the first client.

Example 20 may include elements of any of examples 16 through 19 where the machine-readable instructions may cause the BTB control circuitry to: cause the BTB look-up circuitry to perform a branch lookup using a system BTB data portion responsive to identification of the received branch prediction inquiry as a system level branch prediction inquiry.

Example 21 may include elements of any of examples 16 through 20 where the machine readable instructions that cause the BTB control circuitry to identify the first client responsible for generating the branch prediction inquiry may cause the BTB control circuitry to: identify the first client using a unique identifier associated with the first client.

Example 22 may include elements of any of examples 16 through 21 where the machine readable instructions that cause the BTB control circuitry to identify whether a received branch prediction inquiry includes a system level branch prediction inquiry or a user level branch prediction inquiry may cause the BTB control circuitry to: identify whether the received branch prediction inquiry includes a system level branch prediction inquiry or user level branch prediction inquiry using an identifier associated with the received branch prediction inquiry.

Example 23 may include elements of any of examples 16 through 22 where the machine readable instructions that cause the BTB control circuitry to identify whether the received branch prediction inquiry includes a system level branch prediction inquiry or user level branch prediction inquiry using an identifier associated with the received branch prediction inquiry may cause the BTB control circuitry to: identify whether the received branch prediction inquiry includes a system level branch prediction inquiry or user level branch prediction inquiry using a Current Privilege Level (CPL) associated with the received branch prediction inquiry.

According to examples 24, there is provided an electronic device. The electronic device may include: a printed circuit board; processor circuitry coupled to the printed circuit board; Branch Target Buffer (BTB) circuitry coupled to the processor circuitry, the BTB circuitry including at least a system BTB data portion and a user BTB data portion; BTB control circuitry; BTB look-up circuitry coupled to the BTB control circuitry and the BTB circuitry; and a storage device coupled to the BTB control circuitry, the storage device including machine-readable instructions that, when executed by the BTB control circuitry, cause the BTB-control circuitry to: identify an initiator of a received branch prediction inquiry as a system level initiated branch prediction inquiry or a user level initiated branch prediction inquiry; and cause the BTB look-up circuitry to perform a branch prediction lookup using the respective at least one user BTB data portion associated with the user level inquiry initiator responsive to identification of the received branch prediction inquiry as an user level initiated branch prediction inquiry.

Example 25 may include elements of example 24 where the machine-readable instructions may cause the BTB control circuitry to: cause the BTB look-up circuitry to perform a branch prediction lookup using the system BTB data portion responsive to identification of the received branch prediction inquiry as a system level branch prediction inquiry.

Example 26 may include elements of any of examples 24 or 25 where the machine-readable instructions may cause the BTB control circuitry to update at least one of: a record included in the at least one user level BTB portion to include branch address information and, responsive to a user level branch prediction inquiry, information indicative of an initiator of the user level branch prediction inquiry; or a record included in the at least one system level BTB portion to include branch address information and, responsive to a system level branch prediction inquiry, information indicative of an initiator of the system level branch prediction inquiry.

Example 27 may include elements of any of examples 24 through 26 where the system comprises a server-based system hosting a plurality of clients; and where the machine-readable instructions that cause the BTB control circuitry to identify the initiator of the received branch prediction inquiry as a system-level or a user-level branch prediction inquiry may cause the BTB control circuitry to: identify a first client responsible for initiating the branch prediction inquiry; and where the machine-readable instructions that cause the BTB control circuitry to cause the BTB look-up circuitry to perform a branch prediction lookup using the respective at least one user BTB data portion associated with the user-level inquiry initiator responsive to identification of the received branch prediction inquiry as user-level initiated branch prediction inquiry may cause the BTB look-up circuitry to: perform a branch prediction lookup using the respective at least one BTB data portion associated with the first client responsive to identification of the received user-level branch prediction inquiry as a branch prediction inquiry generated by the first client.

Example 28 may include elements of any of examples 24 through 27 where the machine-readable instructions may cause the BTB look-up circuitry to: perform a branch prediction lookup using a system level BTB data portion responsive to identification of the received branch prediction inquiry as a system-level branch prediction inquiry.

Example 29 may include elements of any of examples 24 through 28 where the machine-readable instructions that cause the BTB look-up circuitry to identify the initiator of the received branch prediction inquiry as a system-level or a user-level branch prediction inquiry may cause the BTB control circuitry to: identify the first client using a unique identifier associated with the first client.

Example 30 may include elements of any of examples 24 through 29 where the machine-readable instructions that cause the BTB look-up circuitry to identify the initiator of the received branch prediction inquiry as a system-level or a user-level branch prediction inquiry may cause the BTB control circuitry to: identify whether the received branch prediction inquiry includes a system level BTB inquiry or a user level BTB inquiry using an identifier associated with the received branch prediction inquiry.

According to example 31, there is provided a branch prediction system. The system may include: means for identifying whether a received branch prediction inquiry includes a system-level branch prediction inquiry or a user-level branch prediction inquiry; and means for performing a branch prediction lookup using the respective at least one user BTB data portion associated with the user level inquiry initiator responsive to identification of the received branch prediction inquiry as an user level initiated branch prediction inquiry.

Example 32 may include elements of example 31, and the system may additionally include: means for performing a branch prediction lookup using a system BTB data portion responsive to identification of the received branch prediction inquiry by the BTB control circuitry as a system level branch prediction inquiry.

Example 33 may include elements of any of examples 31 or 32, and the system may additionally include: means for causing an update that includes at least one of: a record included in the at least one user level BTB portion to include branch address information and, responsive to a user level branch prediction inquiry, information indicative of an initiator of the user level branch prediction inquiry; or a record included in the at least one system level BTB portion to include branch address information and, responsive to a system level branch prediction inquiry, information indicative of an initiator of the system level branch prediction inquiry.

Example 34 may include elements of any of examples 31 through 33, and the system may additionally include: means for identifying a first client responsible for generating the branch prediction inquiry; where the means for performing a branch prediction lookup using the respective at least one user BTB data portion associated with the user level inquiry initiator responsive to identification of the received branch prediction inquiry as an user level initiated branch prediction inquiry includes: means for performing a branch lookup using the respective at least one user BTB data portion associated with the first client responsive to identification of the received branch prediction inquiry as an user level initiated branch prediction inquiry generated by the first client.

Example 35 may include elements of any of examples 31 through 34, and the system may additionally include: means for performing a branch lookup using a system BTB data portion responsive to identification of the received branch prediction inquiry as a system level branch prediction inquiry.

Example 36 may include elements of any of examples 31 through 35 where the means for identifying a first client responsible for generating the branch prediction inquiry may include: means for identifying the first client using a unique identifier associated with the first client.

Example 37 may include elements of any of examples 31 through 36 where the means for identifying whether a received branch prediction inquiry includes a system level branch prediction inquiry or user level branch prediction inquiry may include: means for identifying whether the received branch prediction inquiry includes a system level branch prediction inquiry or user level branch prediction inquiry using an identifier associated with the received branch prediction inquiry.

Example 38 may include elements of any of examples 31 through 37, where the means for identifying whether the received branch prediction inquiry includes a system level branch prediction inquiry or user level branch prediction inquiry using an identifier associated with the received branch prediction inquiry may include: means for identifying whether the received branch prediction inquiry includes a system level branch prediction inquiry or user level branch prediction inquiry using a Current Privilege Level (CPL) associated with the received branch prediction inquiry.

According to example 39, there is provided a system for predicting branches in speculatively executed instructions, the system being arranged to perform the method of any of examples 8 through 15.

According to example 40, there is provided a chipset arranged to perform the method of any of examples 8 through 15.

According to example 41, there is provided at least one machine readable medium comprising a plurality of instructions that, in response to be being executed on a computing device, cause the computing device to carry out the method according to any of examples 8 through 15.

According to example 42, there is provided a device configured for predicting branches in speculatively executed instructions, the device being arranged to perform the method of any of the examples 8 through 15.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:
1. A branch prediction system, comprising:
server processor circuitry;

Branch Target Buffer (BTB) circuitry coupled to the server processor circuitry, the BTB circuitry including at least one system BTB data portion and at least one user BTB data portion;

BTB control circuitry;

BTB look-up circuitry coupled to the BTB control circuitry and the BTB circuitry; and a storage device coupled to the BTB control circuitry, the storage device including machine-readable instructions that, when executed by the BTB control circuitry, cause the BTB-control circuitry to:

identify a first client responsible for initiating a branch prediction inquiry; and identify the received branch prediction inquiry as a system level initiated branch prediction inquiry or a user level initiated branch prediction inquiry; and cause the BTB look-up circuitry to:

perform a branch prediction lookup using the respective at least one user BTB data portion associated with the first client initiator responsive to identification of the received user-level branch prediction inquiry as a branch prediction inquiry initiated by the first client.

2. The branch prediction system of claim 1 wherein the machine-readable instructions further cause the BTB control circuitry to:

cause the BTB look-up circuitry to perform a branch prediction lookup using the system BTB data portion responsive to identification of the received branch prediction inquiry as a system level branch prediction inquiry initiated by the first client.

3. The branch prediction system of claim 2 wherein the machine-readable instructions further cause the BTB control circuitry to update at least one of:

a record included in the at least one user level BTB portion to include branch address information and, responsive to identification of the received branch prediction inquiry as a user level branch prediction inquiry, information indicative of the first client initiator of the user level branch prediction inquiry; or a record included in the at least one system level BTB portion to include branch address information and, responsive to identification of the received branch prediction inquiry as a system level branch prediction inquiry, information indicative of the first client initiator of the system level branch prediction inquiry.

4. The branch prediction system of claim 1 wherein the machine-readable instructions that cause the BTB look-up circuitry to identify the initiator of the received branch prediction inquiry as a system-level or a user-level branch prediction inquiry cause the BTB control circuitry to:

identify the first client using a unique identifier associated with the first client.

5. The branch prediction system of claim 1 wherein the machine-readable instructions that cause the BTB look-up circuitry to identify the initiator of the received branch prediction inquiry as a system-level or a user-level branch prediction inquiry cause the BTB control circuitry to:

identify whether the received branch prediction inquiry includes a system level BTB inquiry or a user level BTB inquiry using an identifier associated with the received branch prediction inquiry.

6. A branch prediction method, comprising:

identifying, by the BTB control circuitry, a first client responsible for generating the branch prediction inquiry;

identifying, by Branch Target Buffer (BTB) control circuitry, whether the received branch prediction inquiry includes a system-level branch prediction inquiry or a user-level branch prediction inquiry; and performing, by BTB look-up circuitry coupled to the BTB control circuitry, a branch prediction lookup using the respective at least one user BTB data portion associated with the first client responsive to identification of the received user-level branch prediction inquiry as an user level initiated branch prediction inquiry generated by the first client.

7. The branch prediction method of claim 6, further comprising:

performing, by the BTB look-up circuitry, a branch prediction lookup using a system BTB data portion responsive to identification of the received branch prediction inquiry by the BTB control circuitry as a system level branch prediction inquiry generated by the first client.

8. The branch prediction method of claim 7, further comprising:

causing the BTB control circuitry to update at least one of:

a record included in the at least one user level BTB portion to include branch address information and, responsive to identification of the received branch prediction inquiry as a user level branch prediction inquiry, information indicative of the first client initiator of the user level branch prediction inquiry; or a record included in the at least one system level BTB portion to include branch address information and, responsive to identification of the received branch prediction inquiry as a system level branch prediction inquiry, information indicative of the first client initiator of the system level branch prediction inquiry.

9. The branch prediction method of claim 8 wherein identifying a first client responsible for generating the branch prediction inquiry comprises:

identifying, by the BTB control circuitry, the first client using a unique identifier associated with the first client.

10. The branch prediction method of claim 8 wherein identifying whether a received branch prediction inquiry includes a system level branch prediction inquiry or user level branch prediction inquiry comprises:

identifying whether the received branch prediction inquiry includes a system level branch prediction inquiry or user level branch prediction inquiry using an identifier associated with the received branch prediction inquiry.

11. The branch prediction method of claim 10 wherein identifying whether the received branch prediction inquiry includes a system level branch prediction inquiry or user level branch prediction inquiry using an identifier associated with the received branch prediction inquiry comprises:

identifying whether the received branch prediction inquiry includes a system level branch prediction inquiry or user level branch prediction inquiry using a Current Privilege Level (CPL) associated with the received branch prediction inquiry.

12. A non-transitory machine-readable storage medium that includes instructions, that when executed by Branch Target Buffer (BTB) control circuitry in a client/server system, cause the BTB control circuitry to:

identify a first client responsible for initiating a branch prediction inquiry; and identify whether a received branch prediction inquiry includes a system level branch prediction inquiry or a user level branch prediction inquiry; and cause communicably coupled BTB look-up circuitry to:
perform a branch prediction lookup using the respective at least one user BTB data portion associated with the first client initiator responsive to identification of the received user-level branch prediction inquiry as a user-level branch prediction inquiry initiated by the first client.

13. The non-transitory machine-readable storage medium of claim 12 wherein the machine-readable instructions further cause the BTB control circuitry to:
cause the BTB look-up circuitry to perform a branch prediction lookup using a system BTB data portion responsive to identification of the received branch prediction inquiry by the BTB control circuitry as a system level branch prediction inquiry initiated by the first client.

14. The non-transitory machine-readable storage medium of claim 13 wherein the machine-readable instructions cause the BTB control circuitry to update at least one of:
a record included in the at least one user level BTB portion to include branch address information and, responsive to identification of the received branch prediction inquiry as a user level branch prediction inquiry, information indicative of the first client initiator of the user level branch prediction inquiry; or
a record included in the at least one system level BTB portion to include branch address information and, responsive to identification of the received branch prediction inquiry as a system level branch prediction inquiry, information indicative of the first client initiator of the system level branch prediction inquiry.

15. The non-transitory machine-readable storage medium of claim 12 wherein the machine readable instructions that cause the BTB control circuitry to identify the first client responsible for generating the branch prediction inquiry cause the BTB control circuitry to:
identify the first client using a unique identifier associated with the first client.

16. The non-transitory machine-readable storage medium of claim 12 wherein the machine readable instructions that cause the BTB control circuitry to identify whether a received branch prediction inquiry includes a system level branch prediction inquiry or a user level branch prediction inquiry cause the BTB control circuitry to:
identify whether the received branch prediction inquiry includes a system level branch prediction inquiry or user level branch prediction inquiry using an identifier associated with the received branch prediction inquiry.

17. The non-transitory machine-readable storage medium of claim 16 wherein the machine readable instructions that cause the BTB control circuitry to identify whether the received branch prediction inquiry includes a system level branch prediction inquiry or user level branch prediction inquiry using an identifier associated with the received branch prediction inquiry cause the BTB control circuitry to:
identify whether the received branch prediction inquiry includes a system level branch prediction inquiry or user level branch prediction inquiry using a Current Privilege Level (CPL) associated with the received branch prediction inquiry.

18. An electronic device, comprising:
a printed circuit board;
processor circuitry coupled to the printed circuit board;
Branch Target Buffer (BTB) circuitry coupled to the processor circuitry, the BTB circuitry including at least a system BTB data portion and a user BTB data portion;
BTB control circuitry;
BTB look-up circuitry coupled to the BTB control circuitry and the BTB circuitry; and
a storage device coupled to the BTB control circuitry, the storage device including machine-readable instructions that, when executed by the BTB control circuitry, cause the BTB-control circuitry to:
identify a first client responsible for initiating a branch prediction inquiry; and
identify the received branch prediction inquiry as a system level initiated branch prediction inquiry or a user level initiated branch prediction inquiry; and
cause the BTB look-up circuitry to perform a branch prediction lookup using the respective at least one user BTB data portion associated with the first client initiator responsive to identification of the received user-level branch prediction inquiry as a branch prediction inquiry initiated by the first client.

19. The electronic device of claim 18 wherein the machine-readable instructions further cause the BTB control circuitry to:
cause the BTB look-up circuitry to perform a branch prediction lookup using the system BTB data portion responsive to identification of the received branch prediction inquiry as a system level branch prediction inquiry initiated by the first client.

20. The electronic device of claim 19 wherein the machine-readable instructions further cause the BTB control circuitry to update at least one of:
a record included in the at least one user level BTB portion to include branch address information and, responsive to identification of the received branch prediction inquiry as a user level branch prediction inquiry, information indicative of the first client initiator of the user level branch prediction inquiry; or
a record included in the at least one system level BTB portion to include branch address information and, responsive to identification of the received branch prediction inquiry as a system level branch prediction inquiry, information indicative of the first client initiator of the system level branch prediction inquiry.

* * * * *